US007996016B2

(12) United States Patent
Ishii

(10) Patent No.: US 7,996,016 B2
(45) Date of Patent: *Aug. 9, 2011

(54) LOCATION SYSTEM

(75) Inventor: Kenichi Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,004

(22) Filed: Mar. 15, 2010

(65) Prior Publication Data

US 2010/0173649 A1 Jul. 8, 2010

Related U.S. Application Data

(62) Division of application No. 11/489,639, filed on Jul. 20, 2006, now Pat. No. 7,493,126, which is a division of application No. 10/623,545, filed on Jul. 22, 2003.

(30) Foreign Application Priority Data

Jul. 31, 2002 (JP) .................................. 2002-223065
Oct. 4, 2002 (JP) .................................. 2002-292097

(51) Int. Cl.
*H04W 24/00* (2009.01)
(52) U.S. Cl. ............... 455/456.1; 455/404.2; 455/456.2; 455/456.3; 455/456.6
(58) Field of Classification Search .... 455/456.1–456.6, 455/457, 404.1, 404.2
See application file for complete search history.

(56) References Cited

U.S. PATENT DOCUMENTS

| 6,078,818 | A | 6/2000 | Kingdon et al. |
| 6,195,557 | B1 | 2/2001 | Havinis et al. |
| 6,272,342 | B1 | 8/2001 | Havinis et al. |
| 6,360,102 | B1 | 3/2002 | Havinis et al. |
| 6,968,195 | B2 | 11/2005 | Nowak |
| 2002/0095486 | A1 | 7/2002 | Bahl |
| 2002/0123354 | A1 | 9/2002 | Nowak |
| 2005/0003829 | A1 | 1/2005 | Lala et al. |
| 2005/0020307 | A1 | 1/2005 | Parupudi et al. |

(Continued)

FOREIGN PATENT DOCUMENTS

CN 1301095 A 6/2001

(Continued)

OTHER PUBLICATIONS

"Universal Mobile Telecommunications System (UMTS); Functional stage 2 description of locaton services (LCS) in UMTS" ETSI TS 123 171 V3.8.0, Jun. 2002, pp. 1-34.

(Continued)

*Primary Examiner* — Kent Chang
*Assistant Examiner* — Dung Lam
(74) *Attorney, Agent, or Firm* — Young & Thompson

(57) ABSTRACT

A location system comprises a communication terminal for transmitting a location request specifying a target mobile terminal and a type of location information, and a location network. In response to the location request, the location network produces current location information of the target mobile terminal if the type of location information of the received request specifies current location information and transmits the current location information to the communication terminal and stores the last known location information in a memory as last known location information of the target mobile terminal. If the type of location information specifies last known location information, stored last known location information of the target mobile terminal is copied from the memory and transmitted to the communication terminal if the location request is verified by a privacy check and if the stored information is reusable.

10 Claims, 34 Drawing Sheets

U.S. PATENT DOCUMENTS

2006/0040677 A1    2/2006    Dietrich et al.

FOREIGN PATENT DOCUMENTS

| JP | 2000-32535 | 1/2000 |
| JP | 2000-48283 | 2/2000 |
| KR | 2002-0058764 | 7/2002 |
| WO | WO 01/39528 A1 | 5/2001 |
| WO | WO 01/41468 A2 | 6/2001 |

OTHER PUBLICATIONS

"Universal Mobile Telecommunications System (UMTS); Functional stage 2 description of location services (LCS) in UMTS", ETSI TS 123 171 V3.8.0, Jun. 2002, pp. 33-61.

"Universal Mobile Telecommunications System (UMTS); Functional stage 2 description of location services (LCS) in UMTS", ETSI TS 123 171 V3.8.0, Jun. 2002, pp. 1-51, XP-002263909.

Technical Report, Enhanced support for User Privacy in location service (Release 5), 3GPP.TR 23.871 V2.1.0, Jul. 25, 2002; pp. 1-27.

"Technical Report Enhanced support for User Privacy in location services (Release 5)"; 3GPP TR 23.871,V2.1.0, Apr. 29, 2002, pp. 1-27, XP-002272724.

3GPP (Third Generation partnership Program) Technical Specification 23.271 v.5.3.0 "Functional stage 2 description of LCS", pp. 33-62, Jun. 2002.

European Patent Office issued an European Search Report dated Dec. 28, 2009, Application No. 063 016 664.9.

European Search Report—EP 10 16 8562—Oct. 28, 2010.

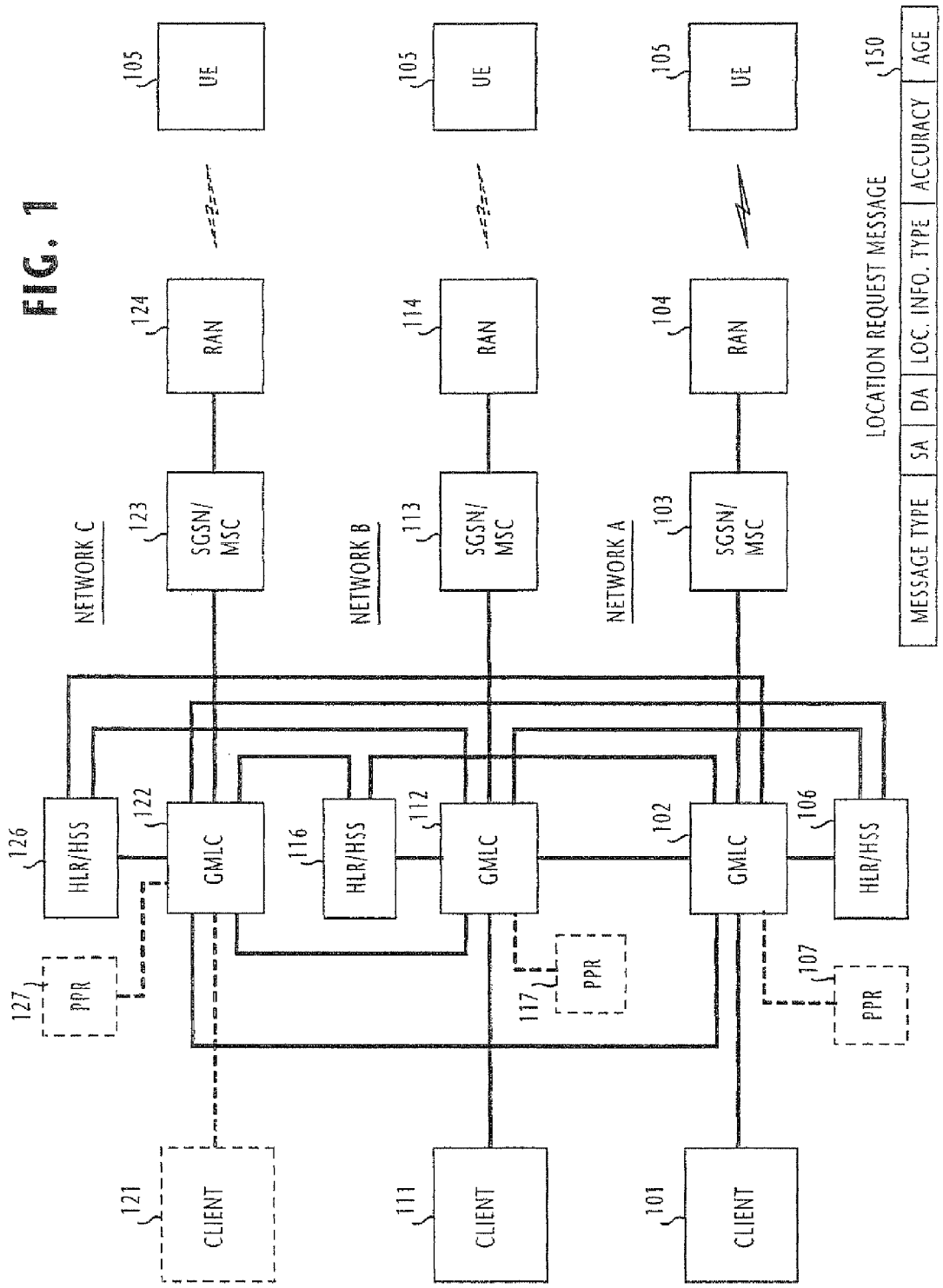

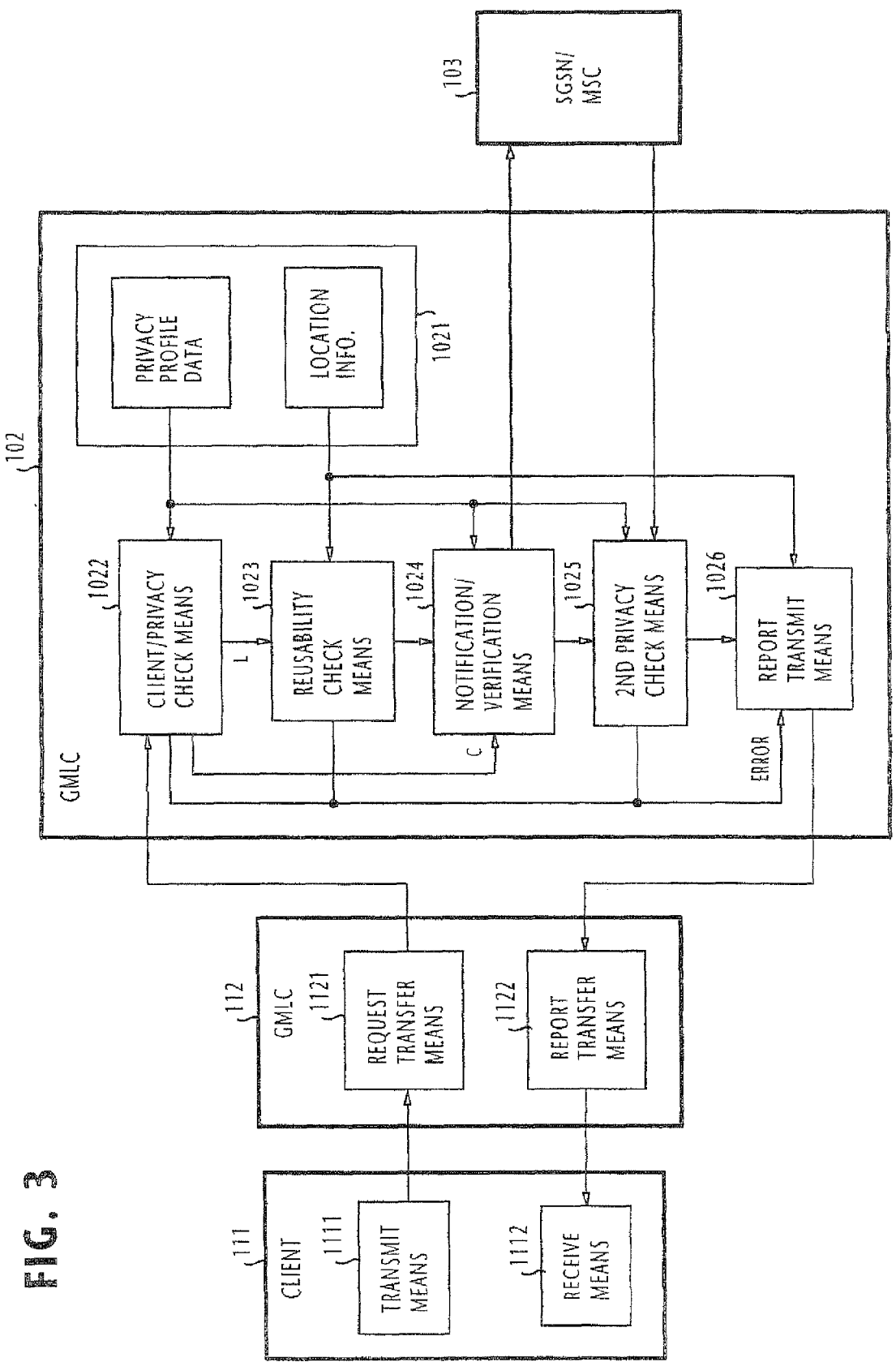

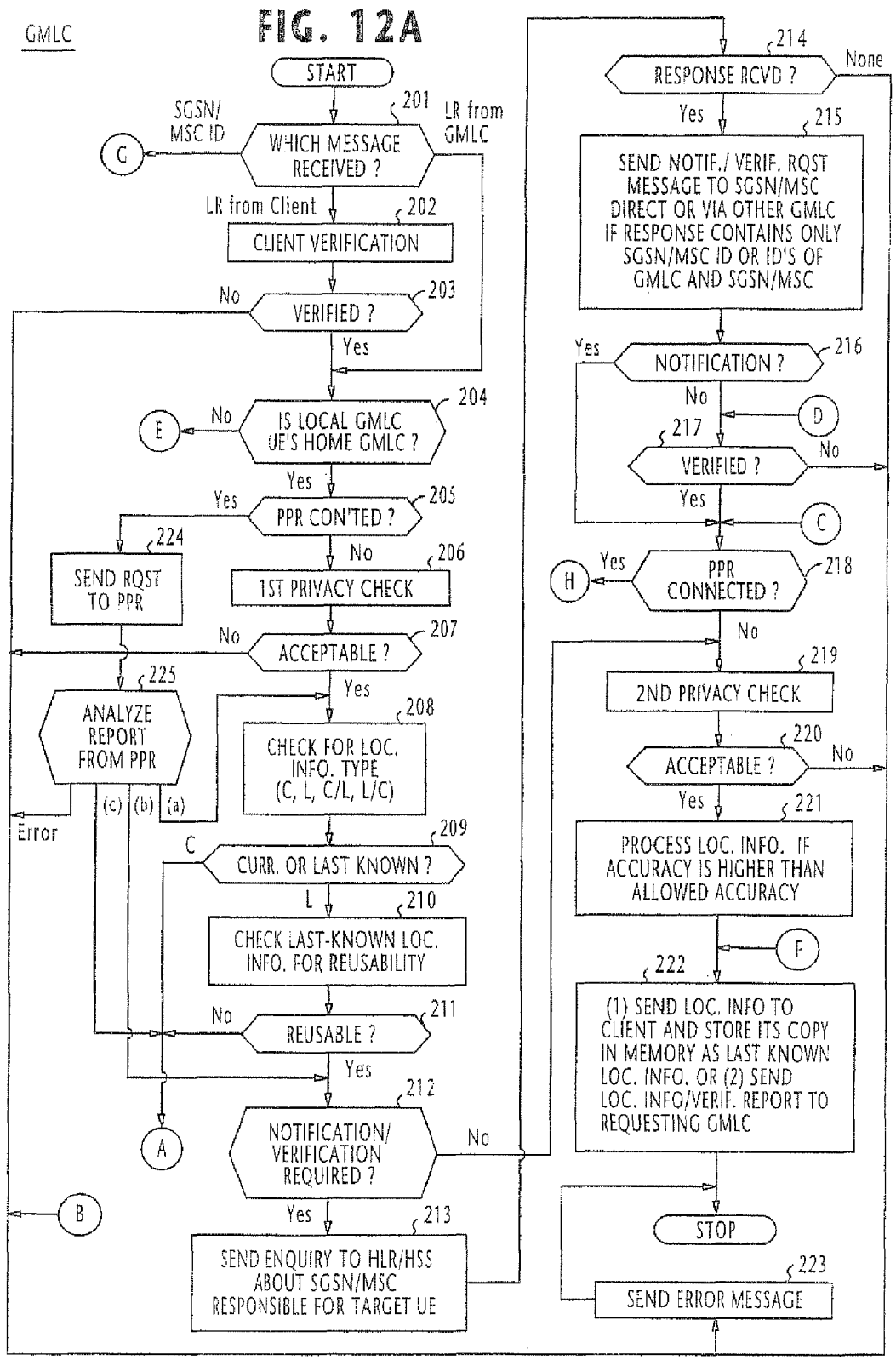

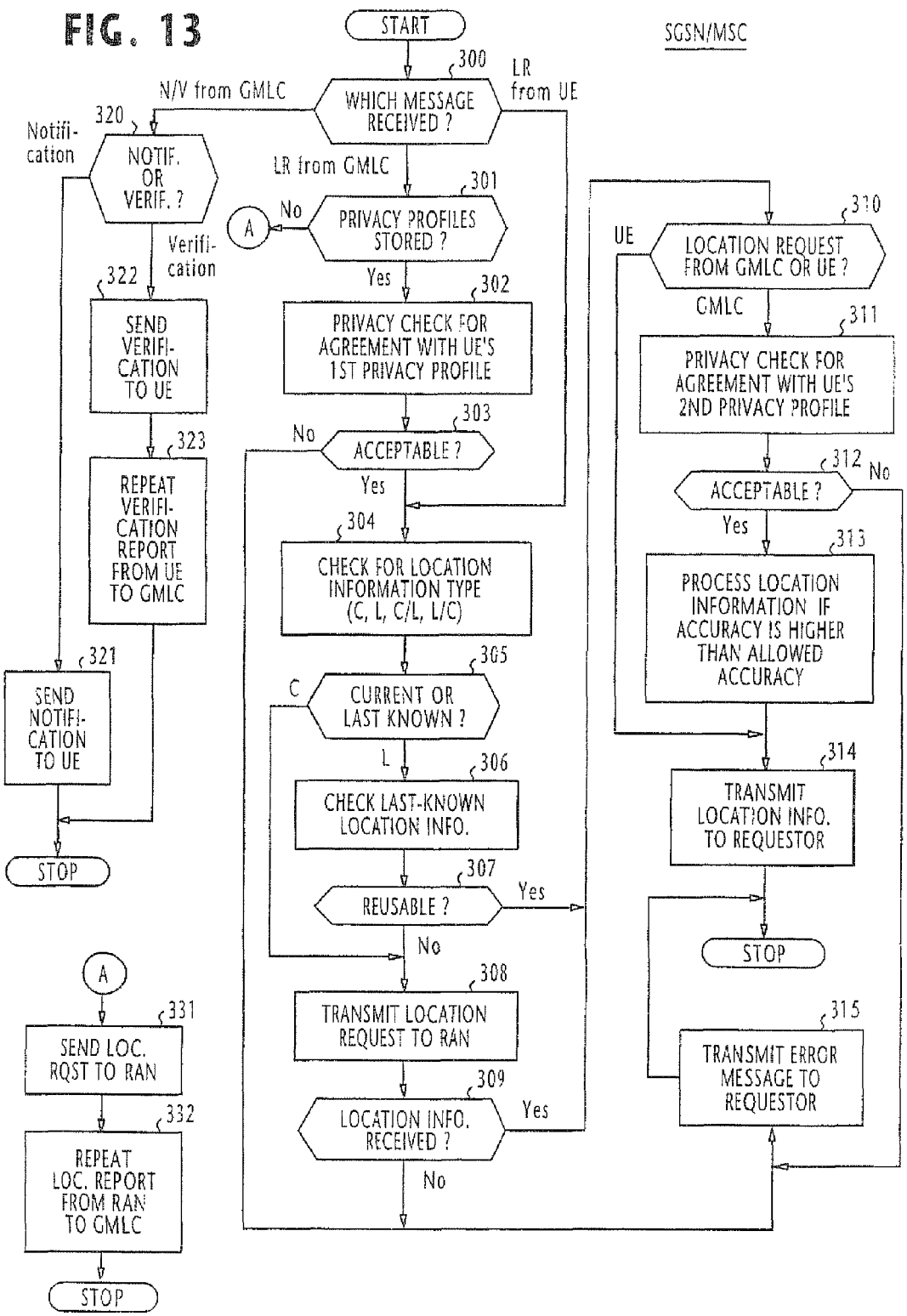

USER EQUIPMENT

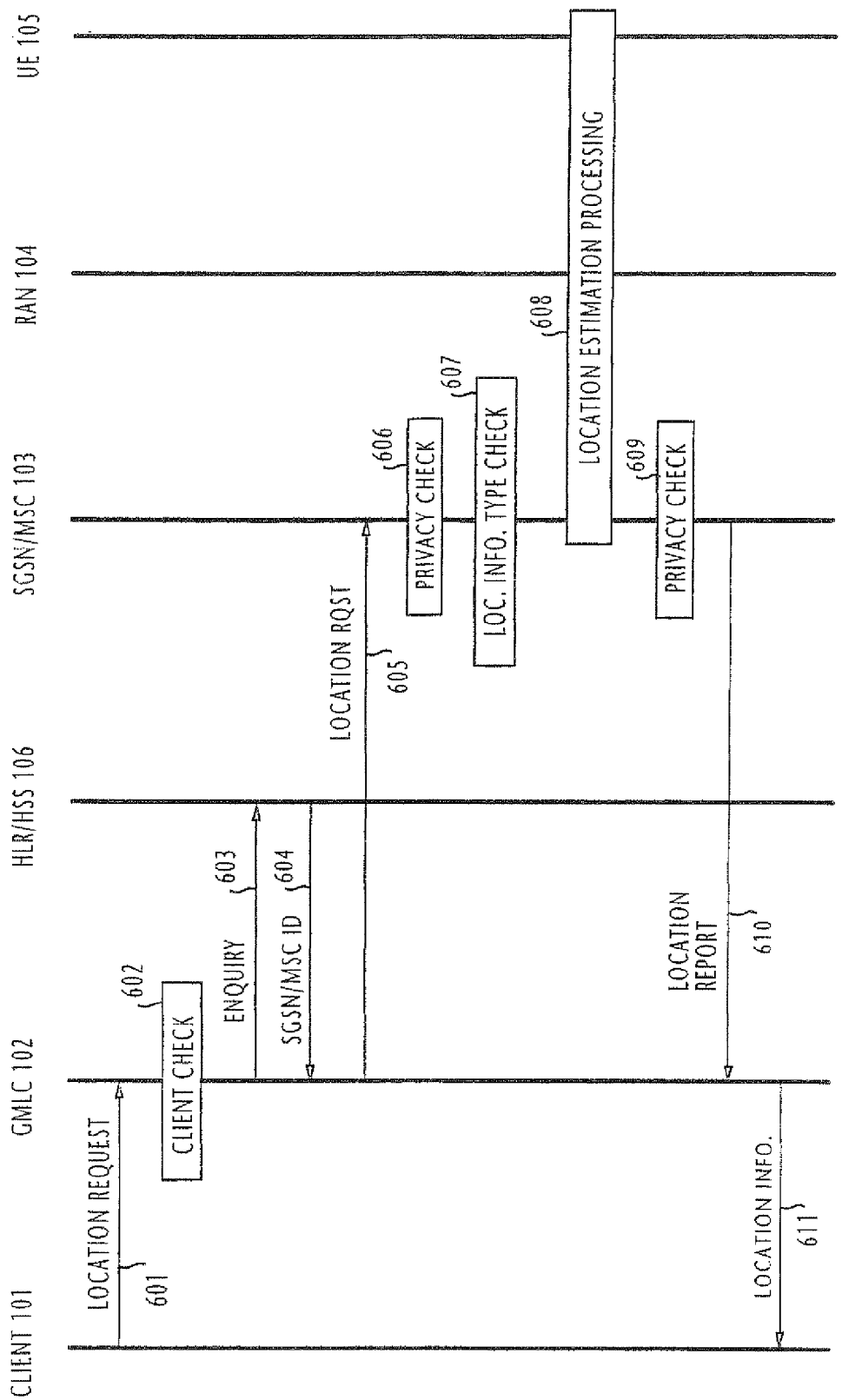

LOCATION SYSTEM

BACKGROUND OF THE INVENTION

1. Field of the Invention

The present invention relates generally to location systems for providing information services to clients as to the location of mobile user equipment (UE) terminals according to the 3GPP (Third Generation Partnership Program) Technical Specification 23.271 v. 5.3.0, "Functional stage 2 description of LCS", pages 33-62, June 2002. More specifically, the present invention is concerned with the reuse of last known location information.

2. Description of the Related Art

The location information of a mobile UE terminal is usually sensitive to the privacy of the mobile user and often crucial when the user is in a critical situation. To protect mobile users from illegal access to their private location information, the mobile communications network is provided with a sophisticated privacy protection mechanism which imposes various restrictions on location requests according to privacy profiles (time and place) specified by the mobile users. The privacy protection mechanism provides two types of verification on a location request according to decision capability that varies with a point in the network where the location request is being served. The first type of verification is performed on a client terminal when the network receives a location request from this terminal, known as client check. The second type of verification is a permission granted to the location request after location information of a UE terminal has been obtained if the place and time interval specified by the privacy profile of the UE terminal user are satisfied, known as privacy check.

Mobile network providers, on the other hand, are required to provide location service in addition to their basic mobile communications service. Specifically, the location service involves several network nodes exchanging special messages with one another for the position calculation of a target UE and exchanging messages with a target UE terminal over wireless link.

The 3GPP location information system, as specified in the 3GPP standard, is basically made up of client terminal, GMLC (Gateway Mobile Location Center), SGSN/MSC (Serving General packet radio service Support Node/Mobile Services switching Center), local wireless network known as RAN (Radio Access Network) and UE (User Equipment) terminal connected to the RAN via wireless link. HLR/HSS (Home Location Register/Home Subscriber Server) is connected to the GMLC as a database for holding the identity of the RAN to which UE terminals are connected. Registered client terminals are given exclusive right to access UE terminals.

The 3GPP standard provides two modes of operation for requesting location information, i.e., the mobile terminated location request (MT-LR) and the mobile originated location request (MO-LR). In the MT-LR mode, the client terminal can either request the current location of a target UE or the current or last known location of this terminal. The last known location information is used as a location report instead of the current location information when the network has failed in locating the target UE for some reason if the last known location information is usable.

More specifically, when the network receives a location request for a target UE, the SGSN/MSC responsible for the management of the target UE is also responsible for the privacy protection of the UE terminal. According to the privacy protection of the MT-LR mode as specified by the 3GPP standard, UE mobile users register their privacy profile (e.g., the identifiers of those clients allowed to request their location) in the SGSN/MSC of their home network. In response to a location request, the SGSN/MSC performs a privacy check by verifying it against the registered privacy profile of the target UE and determines whether or not the location request is granted. If the privacy profile of a UE terminal further specifies that a notification/verification request be sent to the UE terminal, the UE terminal is given a notification that it is being targeted or verifies the location request and returns a verification result to the client terminal. When the location request is acceptable, the SGSN/MSC proceeds with a location estimation process in collaboration with the associated RAN to determine the current location of the target UE. If the SGSN/MSC fails to acquire current location information of a target UE, a copy of the stored last known location information of the target UE is transmitted to the client terminal if this information is currently still usable, or significant.

In the MO-LR mode, the mobile UE terminal exclusively requests its own current location from the network. In this mode, a failure in location measurement will result in the transmission of an error report to the requesting mobile UE terminal. Last known location information is not reused at all for transmission instead of the error report.

However, a number of shortcomings exist in the prior art location system.

First, the flow of traffic through the location network and the amount of location measurement calculations increase in proportion to location requests from client and mobile terminals. Further, part of the location network is shared in common by a mobile communication network. Therefore, when the location network experiences heavy traffic loads, it is likely that mobile communication traffic is adversely affected, which could lead to an extra burden on mobile network providers.

Second, in the MT-LR mode of operation, privacy check is performed by the SGSN/MSC. If reusable last known location information of a UE terminal is available in the GMLC, for example, the SGSN/MSC would perform privacy check for the UE terminal. However, no mechanism is provided for the GMLC to request the SGSN/MSC to perform privacy check. As a result, privacy protection of last known location information is only ensured when this private information is maintained in the GMLC.

Third, the reusability of last known location information depends exclusively on whether or not an SGSN/MSC is holding the last known location information, and the criteria of usability depends on specific details of an SGSN/MSC which may differ among different SGSN/MSCs. Therefore, it is likely that requesting client terminals may receive worthless last known location information.

SUMMARY OF THE INVENTION

It is therefore an object of the present invention to provide a location system that reduces location traffic loads and measurement calculation loads and concomitant elimination of an extra network cost.

It is a further object of the present invention to provide a location system capable of utilizing last known location information of a mobile terminal for both MT-LR (mobile terminated location request) and MO-LR (mobile originated location request) modes of operation, regardless of whether an SGSN/MSC has failed in obtaining current location information of a target mobile UE (user equipment) terminal.

It is a still further object of the present invention to provide a location system capable of providing privacy protection of target UE terminals when their last known location information are reused.

It is a still further object of the present invention to provide a location system capable of establishing reusability criteria for last known location information according to requests from client terminals as well as from UE terminals indicating an age parameter of their last known location information.

According to a first aspect of the present invention, there is provided a location system for locating a plurality of mobile terminals. The system comprises a communication terminal for transmitting a location request specifying a target mobile terminal and a type of location information, and a location network. The location network is responsive to the location request from the communication terminal for producing current location information of the target mobile terminal if the type of location information of the received request specifies current location information and transmitting the current location information to the communication terminal and storing the last known location information in a memory as last known location information of the target mobile terminal, and copying stored last known location information of the target mobile terminal from the memory if the type of location information specifies last known location information and transmitting the copied information to the communication terminal.

The network performs a reusability test on the stored last known location information and transmits the last known location information if the reusability test indicates a favorable result and transmits the current location information if the reusability test indicates an unfavorable result.

According to a second aspect, the present invention provides a location method comprising the steps of transmitting a location request from a communication terminal, the request specifying a target mobile terminal and a type of location information, receiving the location request at a location network, producing current location information of the target mobile terminal and transmitting the current location information from the location network to the communication terminal if the type of location information of the received request specifies current location information, storing the current location information in a memory as last known location information of the target mobile terminal, and copying the stored last known location information of the target mobile terminal from the memory if the type of location information specifies last known location information and transmitting the copied information from the location network to the communication terminal.

According to a third aspect, the present invention provides a method of operating a gateway with a location network. The method comprises the steps of receiving a location request from a communication terminal, said request specifying a target mobile terminal and a type of location information, acquiring current location information of the target mobile terminal from said location network and transmitting the current location information to said communication terminal if the type of location information of the received request specifies current location information, storing the current location information in a memory as last known location information of the target mobile terminal, and transmitting a copy of the stored last known location information of the target mobile terminal to said communication terminal if said type of location information specifies last known location information.

According to a fourth aspect, the present invention provides a communication terminal which comprises a transmit means for transmitting a location request to a location system in which last known location information of mobile terminals are stored, the location request specifying a target mobile terminal and a type of last known location information, and receive means for receiving from the location system a copy of current location information of the target mobile terminal if the type specifies current location information or a copy of last known location information of the target mobile terminal if the type specifies last known location information.

BRIEF DESCRIPTION OF THE DRAWINGS

The present invention will be described in detail further with reference to the following drawings, in which:

FIG. 1 is a block diagram of a location system of the present invention;

FIG. 3 is a block diagram useful for describing a second network configuration of the present invention;

FIGS. 12A to 12E are flowcharts of the operation of a local GMLC which maintains the privacy information of its home UE terminals.

FIG. 13 is a flowchart of the operation of a SGSN/MSC of the present invention;

FIGS. 15A, 15B and 15C are sequence diagrams associated with the first network mode of operation of the present invention;

GENERAL DESCRIPTION

Figure 2A:
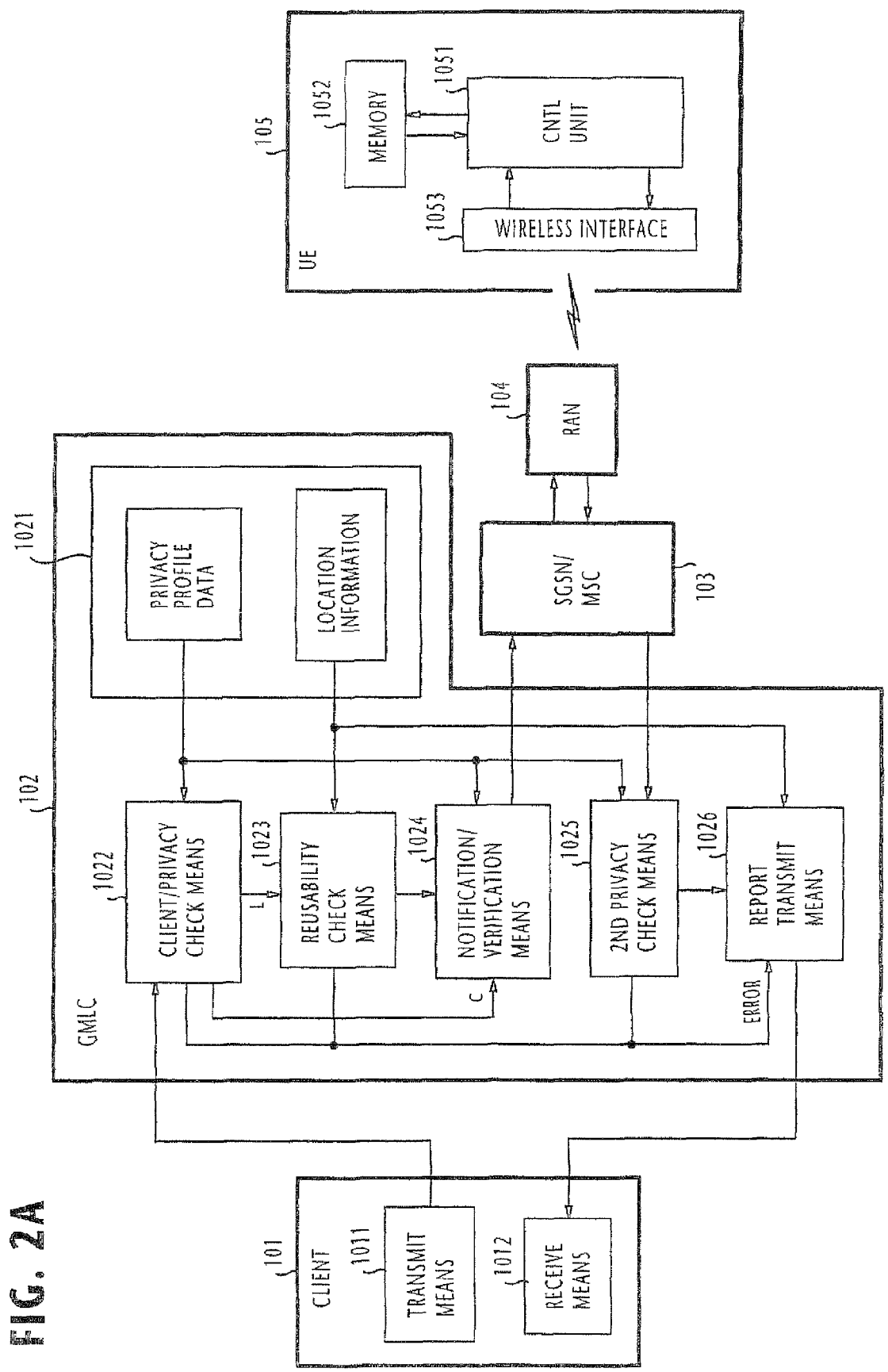
FIGS. 2A and 2B are block diagrams useful for describing a first network configuration of the present invention.

Referring now to FIG. 1, there is shown a location system of a mobile multi-network in which the present invention is incorporated. The location system is comprised of a plurality of client terminals 101, 111, 121 connected via landline links to a location network and a mobile UE terminal 105 wirelessly connected the location network.

The location network is formed by a plurality of GMLCs (Gateway Mobile Location Centers) 102, 112, 122 to which client terminals 101, 111, 121 are respectively connected to send their location requests to and receive location reports from the associated GMLCs. GMLCs 102, 112, 122 are connected to SGSN/MSCs (Serving General packet radio service Support Node/Mobile service Switching Centers) 103, 113 and 123, respectively, and mutually connected to one another. SGSN/MSCs 103, 113, 123 are respectively connected to RANs (Radio Access Networks) 104, 114, 124. Further associated with the GMLCs 102, 112, 122 are HLR/HSSs (Home Location Register/Home Subscriber Server) 106, 116 and 125. Privacy profile registers (PPR) 107, 117, 127 are also connected to the GMLCs 102, 112, 122, respectively.

The network nodes which are directly connected to each other, such as GMLC, HLR/HSS, SGSN/MSC, RAN, PPR, form a group known as a home network for mobile UE (user equipment) terminals. For example, a UE terminal 105 is connected as a home UE terminal via a wireless link to the RAN 104.

As shown in FIG. 1, the client terminal transmits a location request message 150 having a number of fields containing a message type, a source address (client's identifier), a destination address (phone number of target mobile UE terminal), a location information type and a reusability criteria. The location information type field specifies a type of location information (C=current, L=last known, C/L=current or last known, or L/C=last known or current). The "current or last known" type indicates that the current location information is given priority over the last known location information if both information are available, and the "last known or current" type of location information indicates that the last known location information is given priority over the current location information if both information are available. Current location information may be a default setting. If the requesting user desires a previous location of a target UE terminal, the information-type field of the message is set equal to L. If the requesting user desires a previous location of a target UE terminal, but allows current location information if the previous location is not available nor reusable, the message contains an information-type field set equal to L/C. The information-type field of the message may be set equal to C/L if the user allows last known location information if current location information is not available. The reusability criteria field of the location request message specifies the accuracy of last known location information (allowable distance error) and the allowable age of last known information. The reusability criteria will be used by the location network to make a decision as to whether stored last known location information of a UE terminal can be reused.

Each mobile terminal is also capable of transmitting a location request which specifies its own mobile terminal and contains a type of location information.

The location network stores last known location information of the mobile terminals. The location network is responsive to a location request from the communication terminal, either from client terminal or mobile terminal, for producing current location information of a target mobile terminal specified by the request and transmitting it to the communication terminal if the type of location information of the received request is current location information, and transmitting a copy of the stored last known location information of the target mobile terminal to the communication terminal if the type of location information is last known location information.

The location network is responsive to a location request from the client terminal for performing privacy check on the location request prior to the transmission of said last known location information to the communication terminal. The location network performs reusability check on the stored last known location information according to the privacy profile of the target mobile terminal or client terminal.

Identification data of the SGSN/MSCs 103, 113, 123 are maintained in the associated HLR/HSSs 106, 116, 126. The privacy profile of UE terminal 105 is stored in the GMLC of the home network, (i.e., GMLC 102).

Network Configurations

The present invention provides a number of network configurations depending on the location of the requesting communication terminal (client or mobile), the location of the target UE terminal 105 as well as the location of network nodes where privacy profiles and location reports are maintained.

First Network Configuration

Figure 2B:
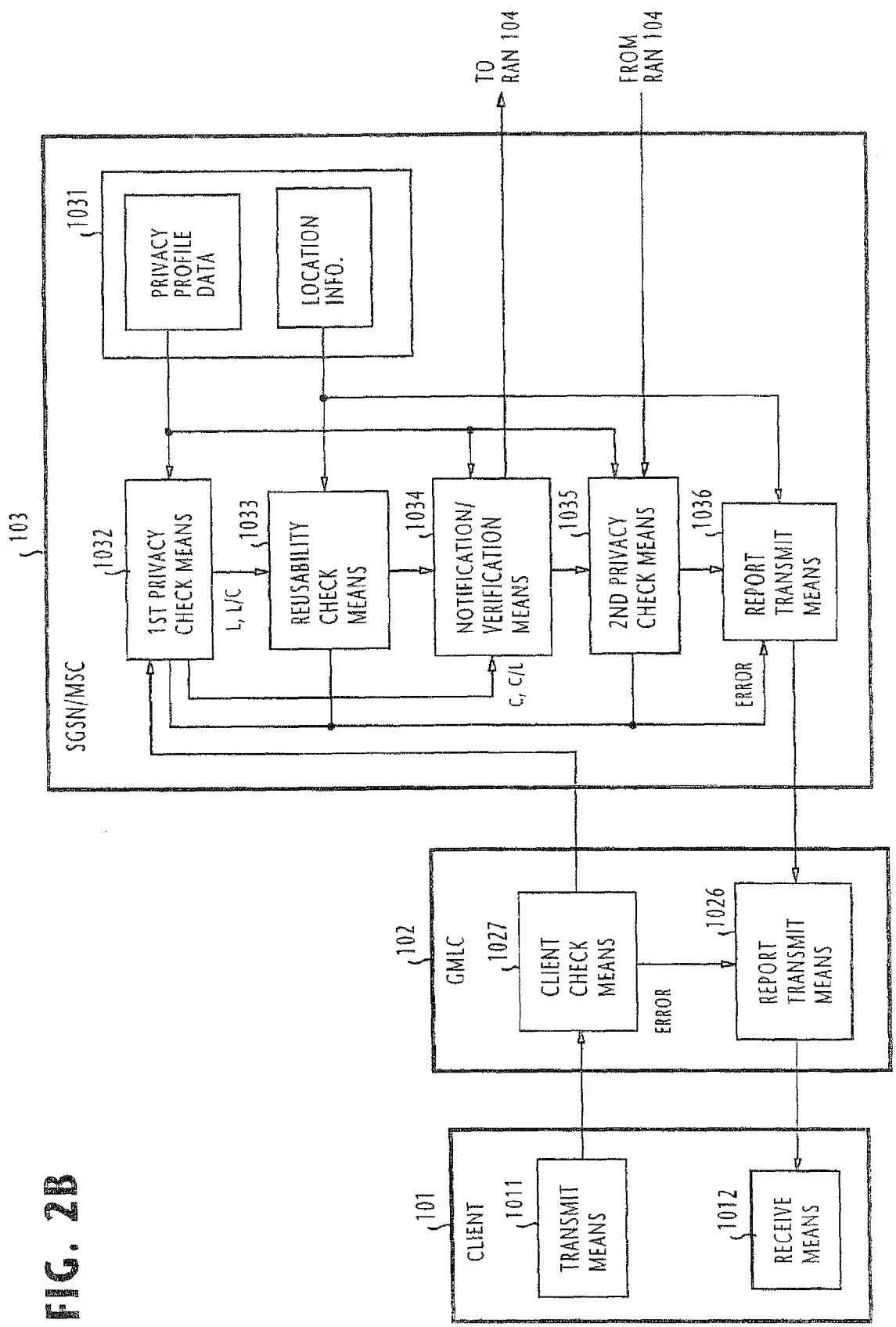

The first network configuration is shown in FIGS. 2A and 2B. The client terminal 101 is the requesting terminal, and the target UE 105 is currently establishing its link to home network A.

In FIG. 2A, the privacy profile and location information of the target UE are maintained in the home GMLC 102. The client terminal 101 includes a transmit means 1011 for transmitting a location request to the home GMLC 102 and a receive means 1012 for receiving location information from the GMLC 102. GMLC 102 includes a memory 1021 for storing the privacy profile and last known location information of UE 105, and a client/privacy check means 1022. In response to the location request from the client terminal 101, the client/privacy check means 1022 performs a client check on the requesting terminal.

If the client terminal fails to pass the client check, the client/privacy check means 1022 formulates an error message and sends it from a report transmit means 1026 to the requesting terminal 101. If the client terminal is verified, the client/privacy check means 1022 proceeds to reference the privacy profile of the target UE stored in the memory 1021 and performs a first privacy check on the location request. If the location request fails to pass the first privacy check, an error message is supplied from the check means 1022 to the report transmit means 1026 and transmitted to the client terminal. If the location request is verified by the first privacy check, the check means 1022 determines which type of location information the request specifies.

If the location request specifies type C or C/L, the client/privacy check means 1022 instructs a notification/verification means 1024 to transmit a location request to the SGSN/MSC 103 to perform a location estimation process with the RAN 104 to determine the location of the target UE 105. A location report is then returned from the SGSN/MSC 103 to a second privacy check means 1025. In response to the location report, the second privacy check means 1025 proceeds to perform a second privacy check.

If the location request specifies type L or L/C, the client/privacy check means 1022 instructs a reusability check means 1023 to make a search through the memory 1021 for last known location information that meets the "age and place" requirements of the client's request. If the requested last known location information of the target UE is not stored in the memory 1021, the reusability check means 1023 generates an error message and transmits it to the client terminal 101 from the report transmit means 1026.

If the requested last known location information is stored in the memory 1021, the reusability check means 1023 instructs the notification/verification means 1024 to check the UE's privacy profile to see if notification/verification process must be performed. If this is the case, the notification/verification means 1024 acquires the identity of this SGSN/MSC 103 from the home HLR/HSS 106 of the target UE 105 and transmits a notification/verification message to SGSN/MSC 103 to request it to send a notification to the UE 105 for indicating that a location request is being terminated or a verification message to it to request it to verify the client terminal. In the former case, the SGSN/MSC 103 proceeds to request the second privacy check means to perform a second privacy check on the last known location information. In the latter case, the target UE returns a verification report to the SGSN/MSC 103, which repeats the report to the second privacy check means 1025 to perform a second privacy check if the location request is verified by the target UE.

The second privacy check involves verifying the location request against the privacy profile of the target UE stored in the memory 1021 and determining whether the current or UE's last known location information can be sent to the client terminal. If the location request is not verified by the second privacy check, an error message is sent from the report transmit means 1026 to the client terminal. If the location request is verified by the second privacy check, the report transmit means 1026 transmits the location information contained in the location report from the SGSN/MSC 103 or a copy of the UE's last known location information stored in the memory 1021.

In a MO-LR mode of operation, the mobile UE terminal 105 includes a control unit 1051 for transmitting a location request via a wireless interface 1053 to the RAN 104 for requesting the location information of its own terminal from the SGSN/MSC 103. The location request is of the same format as used in transmitting a location request from the client terminal. SGSN/MSC 103 formulates and transmits a location report containing current or last known location information of the UE terminal, depending on the type of location information specified by the location request message. The location report is transferred via the RAN 104 to the UE terminal 105 and received and stored in a memory 1052 and then displayed.

In FIG. 2B, the privacy profile and location information of the target UE are maintained in the SGSN/MSC 103. GMLC 102 includes a client check means 1027 and a report transmit means 1026. Client check means 1027 performs a client check on the location request from the client terminal 101. If the client check means 1027 does not verify the client terminal 101, it sends an error message to the client terminal from the report transmit means 1026. Otherwise, the client check means 1027 acquires the identity of SGSN/MSC 103 from HLR/HSS 106 and sends a privacy check request to the SGSN/MSC 103.

SGSN/MSC 103 includes a first privacy check means 1032, which receives the privacy check request and performs a first privacy check using the privacy profile of the target UE stored in a memory 1031. If the location request is verified, the first privacy check means 1032 determines which of the location information type the verified request specifies.

If the location request specifies type C or C/L, the first client check means 1032 instructs a notification/verification means 1034 to transmit a location request to the RAN 104 to perform a location estimation process to determine the location of the target UE 105. A location report is then returned from the RAN 104 to a second privacy check means 1035. In response to the location report, the second privacy check means 1035 proceeds to perform a second privacy check.

If the location request specifies type L or L/C, the first privacy check means 1032 instructs a reusability check means 1033 to make a search through the memory 1031 for last known location information that meets the "age and place" requirements of the client's request. If the requested last known location information of the target UE is not stored in the memory 1031, the reusability check means 1033 generates an error message and transmits it from the report transmit means 1036 to the client terminal 101. If the requested last known location information is stored in the memory 1031, the reusability check means 1033 instructs the notification/verification means 1034 to check the UE's privacy profile to see if notification/verification process must be performed. If this is the case, the notification/verification means 1034 transmits a notification to the UE 105 from the RAN 104 for indicating that a location request is being terminated or a verification message to request it to verify the client terminal. In the former case, the notification/verification means 1034 instructs the second privacy check means 1035 to perform a second privacy check on the last known location information. In the latter case, the second privacy check means 1035 receives a verification report from the target UE and proceeds to perform a second privacy check if the client terminal is verified by the target UE.

The second privacy check involves verifying the location request against the privacy profile of the target UE stored in the memory 1031 and determining whether the current or UE's last known location information can be sent to the client terminal. If the location request is verified by the second privacy check, the report transmit means 1036 transmits to the GMLC 102 the location information contained in the location report from the RAN 104 or a copy of the UE's last known location information stored in the memory 1031.

Second Network Configuration

According to the second network configuration shown in FIG. 3, the client terminal 111 is the requesting terminal and the target UE terminal 105 is currently establishing its link to the home network A. The privacy profile and location report of the target UE terminal 105 are maintained in the home GMLC 102 similar to that shown in FIG. 2A.

Client terminal 111 includes a transmit means 1111 for transmitting a location request to the home GMLC 112 and a receive means 1112 for receiving a location report from the GMLC 112. GMLC 112 includes a request transfer means 1121 which identifies the GMLC 102 as a node that maintains the privacy profile and location information of the target UE 105 by acquiring its node identifier from the home HLR/HSS 106 of the target UE. GMLC 112 includes a report transfer means 1122 for repeating a location report from the GMLC 102 to the client terminal 111.

GMLC 102 is of identical configuration to that shown in FIG. 2A. GMLC 102 operates on the location request from the GMLC 112 in a manner identical to its operation on the location request directly received from the client terminal 101 of FIG. 2A. Therefore, the description of GMLC 102 is omitted for simplicity.

Third Network Configuration

Figure 4:
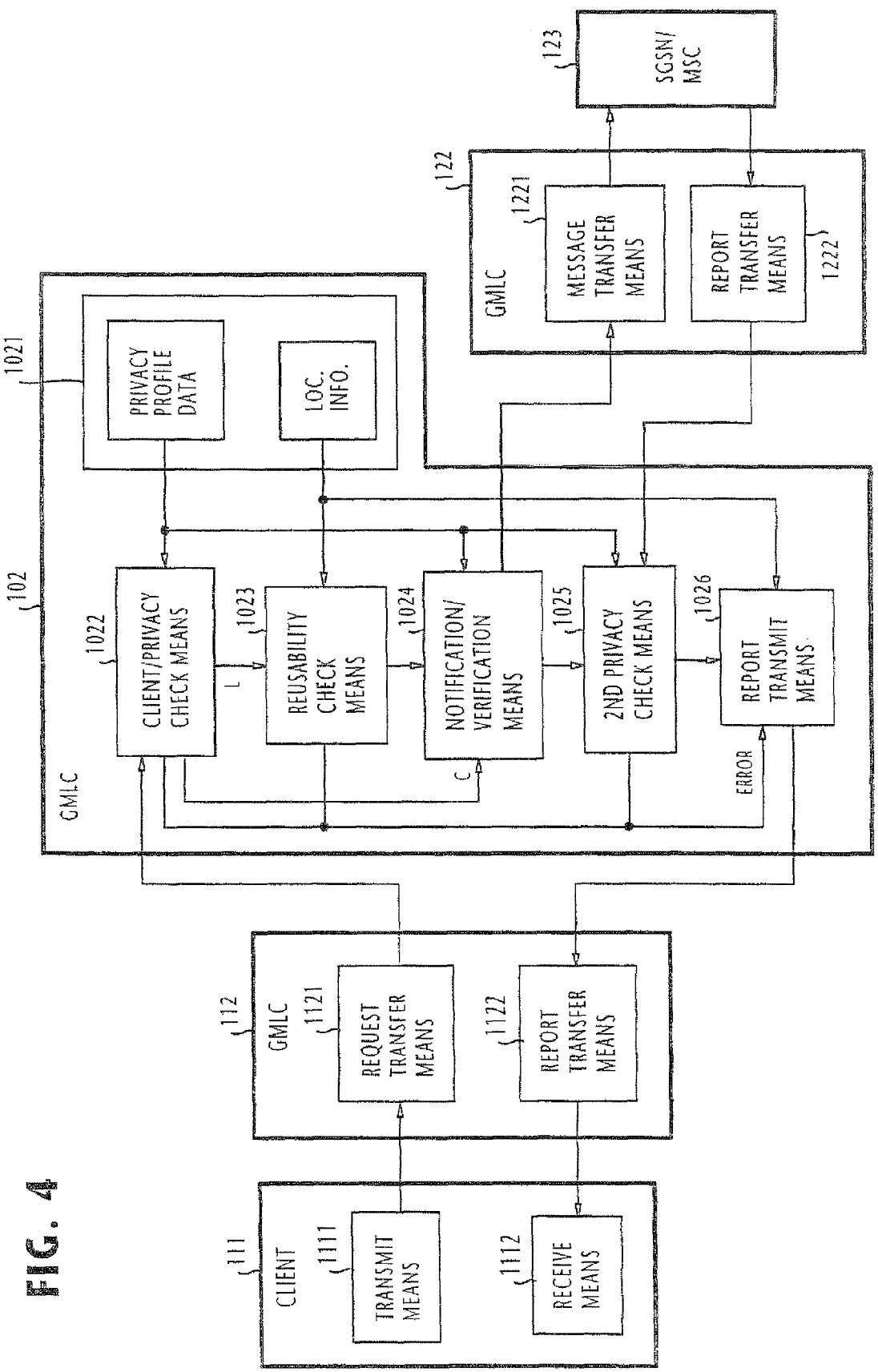
FIG. 4 is a block diagram useful for describing a third network configuration of the present invention.

According to the third network configuration shown in FIG. 4, client terminal 111 is the requesting terminal and the target UE terminal 105 is currently visiting the external network C. The privacy profile and location report of the target UE terminal 105 are maintained in the home GMLC 102 similar to that shown in FIG. 3.

Client terminal 111 sends a location request from transmit means 1111 to the home GMLC 112 and receives a location report by receive means 1112 from the GMLC 112. Similar to FIG. 3, the request transfer means 1121 repeats the received location request to the GMLC 102 and the report transfer means 1122 repeats a location report from the GMLC 102 to the client terminal 111. In the GMLC 102, memory 1021 maintains the privacy profile and last known location information of the target UE 105. GMLC 102 is of the same configuration as in FIG. 3. The operation of GMLC 102 is the same as that of FIG. 3 except that its notification/verification means 1024 sends notification/verification and location request messages to the GMLC 122 of the visited network C and its second privacy check means 1025 receives verification and location reports from the GMLC 122.

GMLC 122 includes a message transfer means 1221 for repeating the message from the GMLC 102 to the SGSN/MSC 123 of the visited network C and a report transfer means 1222 for repeating verification and location reports from the SGSN/MSC 123 to the GMLC 102.

Fourth Network Configuration

Figure 5:
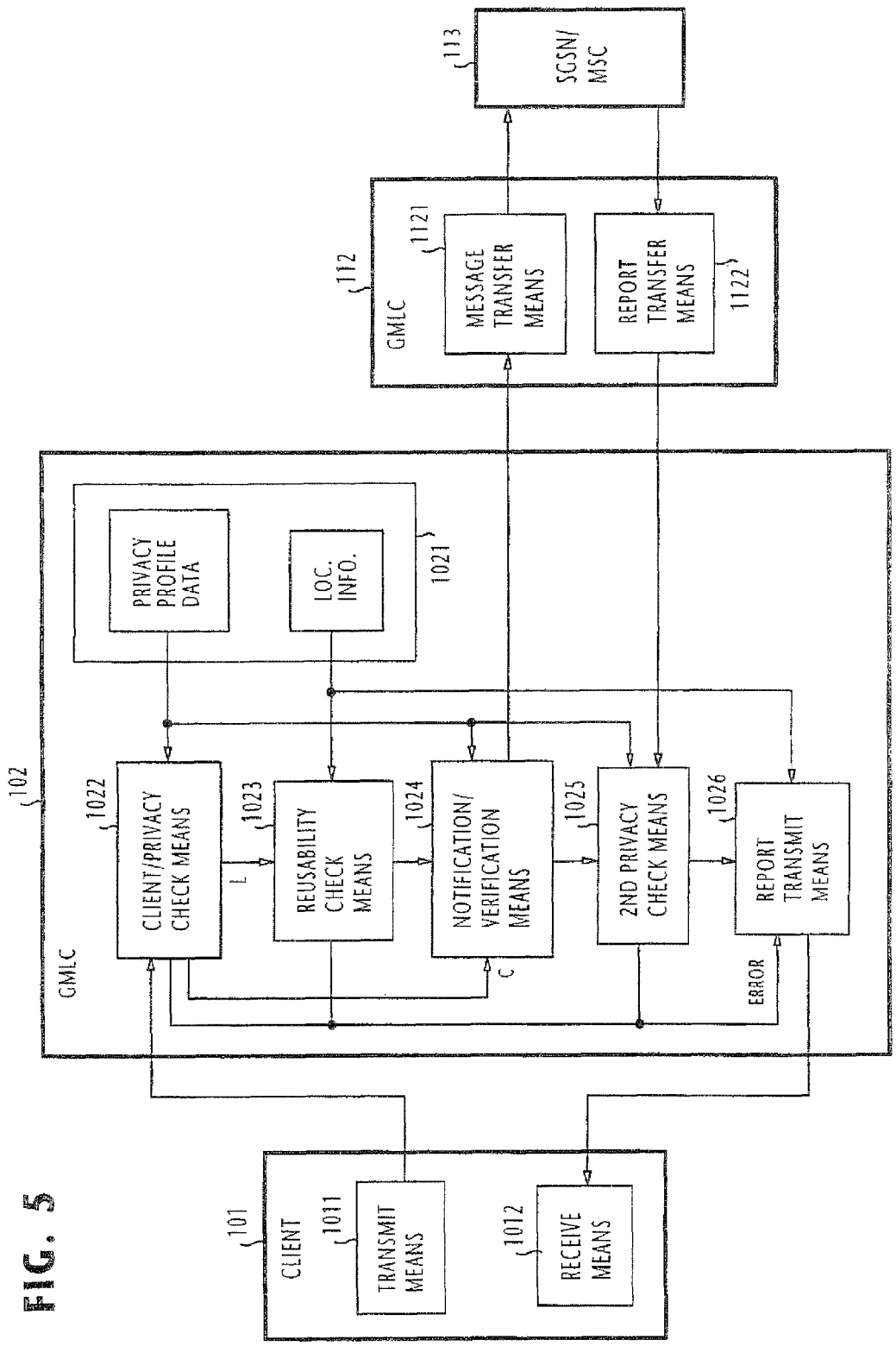
FIG. 5 is a block diagram useful for describing a fourth network configuration of the present invention.

According to the fourth network configuration shown in FIG. 5, the client terminal 101 is the requesting terminal and the target UE terminal 105 is currently visiting the external network B. The privacy profile and location report of the target UE 105 are maintained in the home GMLC 102.

The location network of this configuration is similar to that of FIG. 2A with the exception that its notification/verification means 1024 sends notification/verification and location request messages to the GMLC 112 of the visited network B and its second privacy check means 1025 receives verification and location reports from the GMLC 112.

GMLC 112 includes a message transfer means 1121 for repeating the message from the GMLC 102 to the SGSN/MSC 113 of the visited network B and a report transfer means 1122 for repeating verification and location reports from the SGSN/MSC 113 to the GMLC 102.

Fifth Network Configuration

Figure 6:
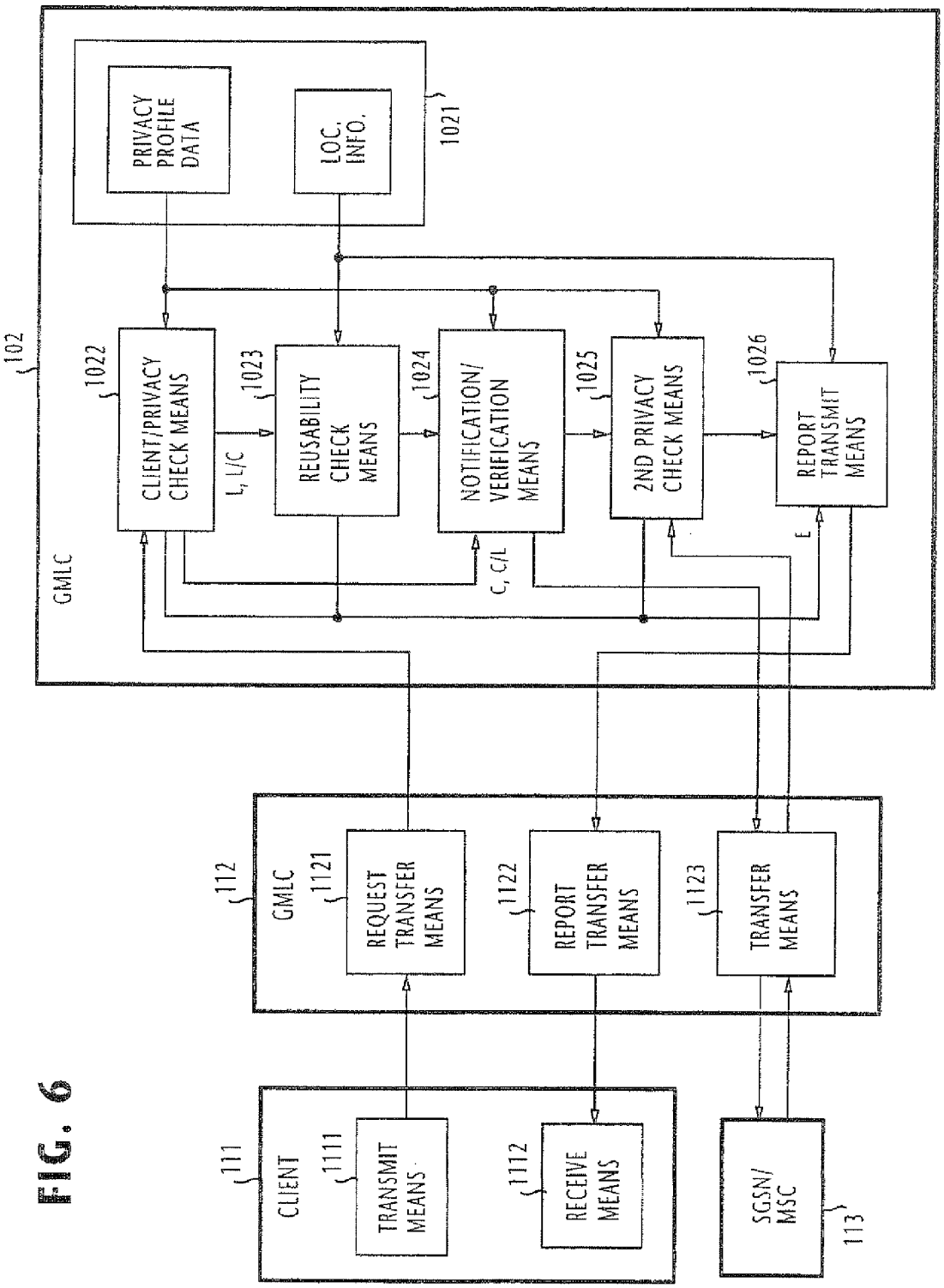
FIG. 6 is a block diagram useful for describing a fifth network configuration of the present invention.

According to the fifth network configuration shown in FIG. 6, the client terminal 111 is the requesting terminal and the target UE terminal 105 is currently visiting the external network B. The privacy profile and location report of the target UE terminal 105 are maintained in the home GMLC 102.

The location network of this configuration is similar to that of FIG. 4 with the exception that the GMLC 112 of the visited network B includes a transfer means 1123 and the notification/verification means 1024 of GMLC 102 sends notification/verification and location request messages to the transfer means 1123 for repeating it to the SGSN/MSC 113 of the visited network B. The second privacy check means 1025 of GMLC 102 receives verification and location reports from the SGSN/MSC 113 via the transfer means 1123 of GMLC 112.

Sixth Network Configuration

Figure 7A:
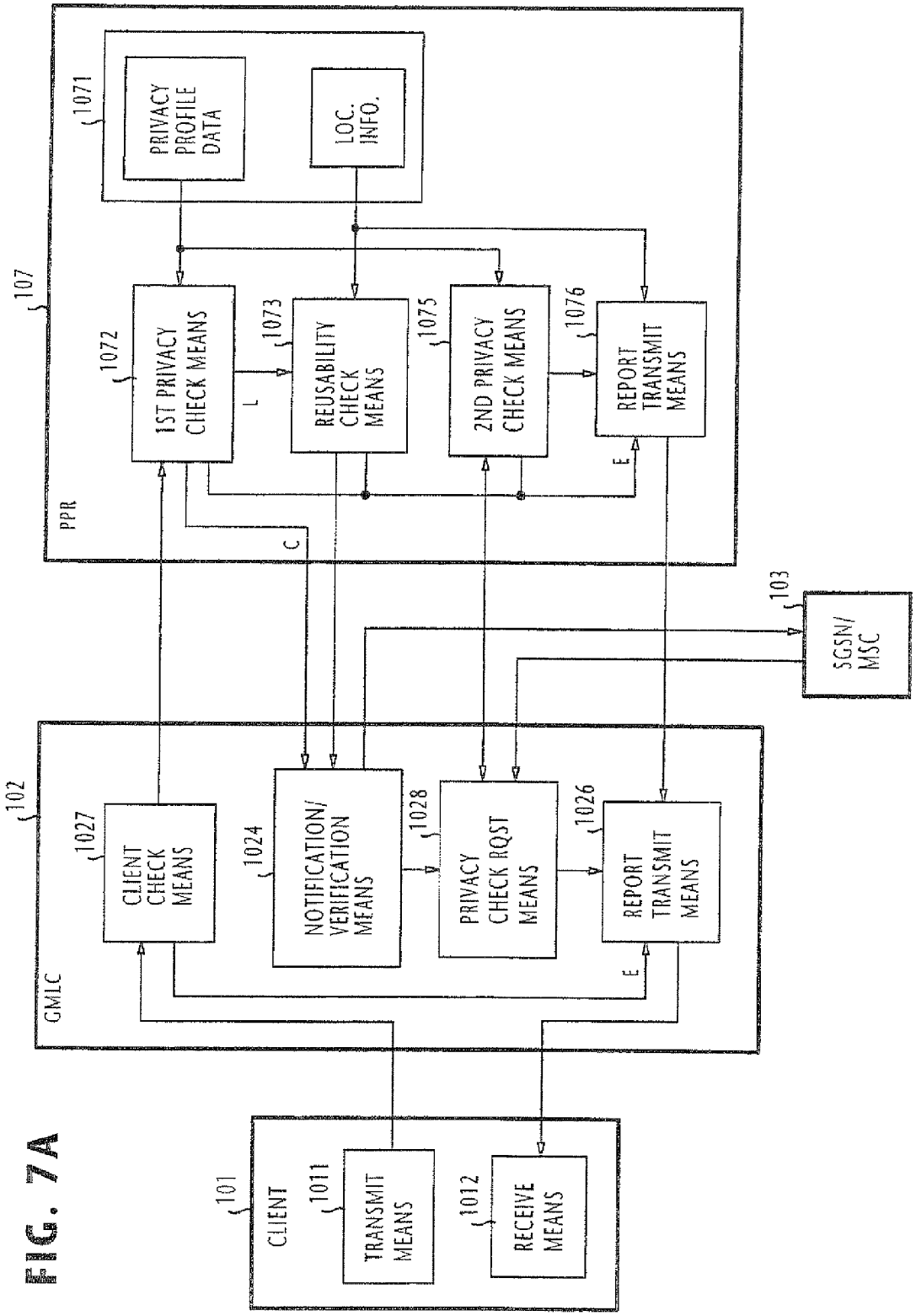
FIGS. 7A and 7B are block diagrams useful for describing a sixth network configuration of the present invention.
Figure 7B:
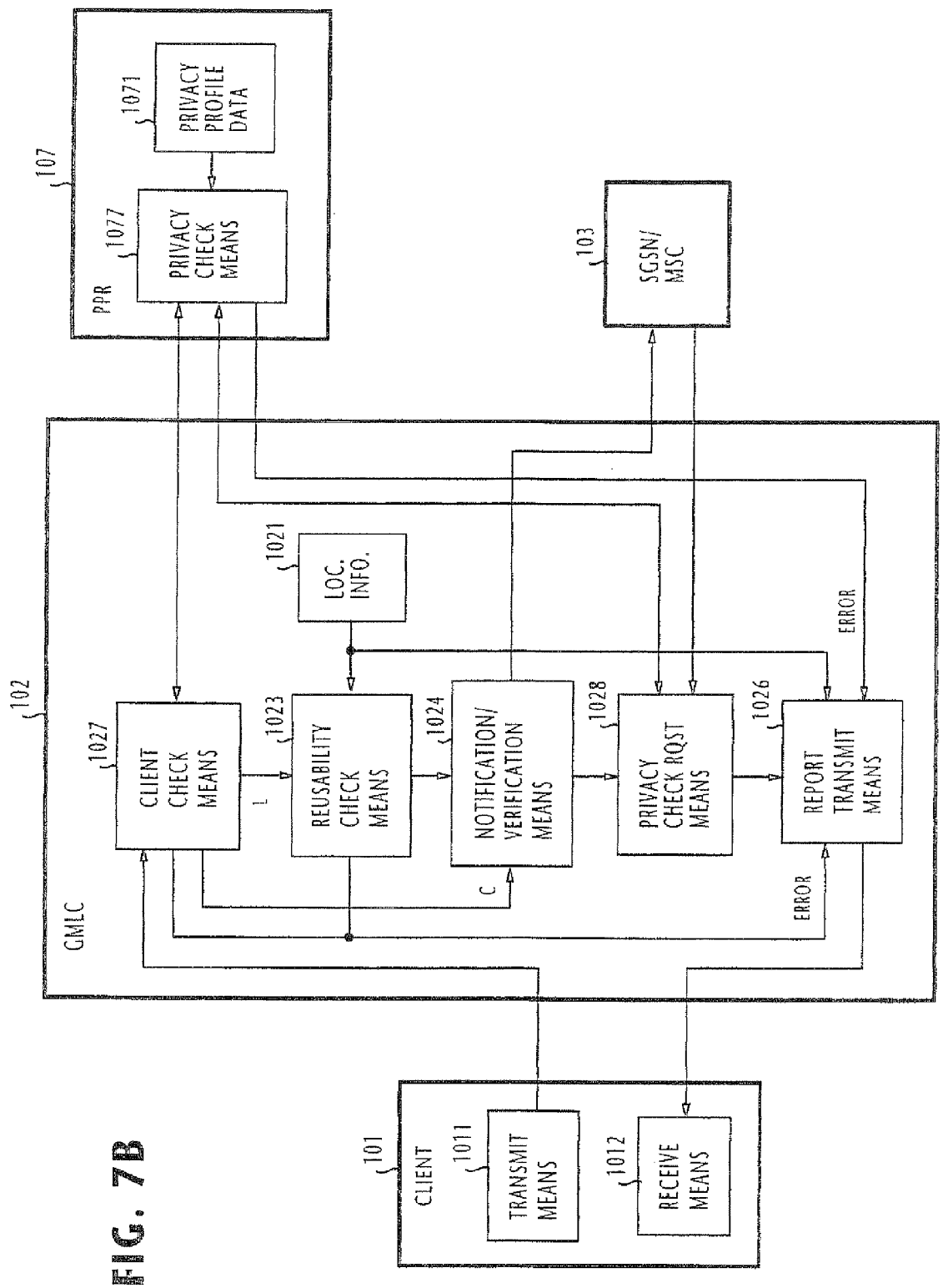

The sixth network configuration is shown in FIGS. 7A and 7B in which the client terminal 101 is the requesting terminal and the target UE terminal 105 is currently establishing its link to the home network A. In FIG. 7A, the privacy profile and location information of the target UE terminal 105 are both maintained in the PPR 107.

In FIG. 7A, the GMLC 102 includes a client check means 1027 to perform a client check on the location request from the client terminal 101. If the request is verified, the client check means 1027 transmits an authorization request to the PPR 107 for authorizing it to perform a number of checks including a first privacy check, an information type check and a reusability test. PPR 107 includes a memory 1061 for storing privacy profiles and location information of mobile terminals and a first privacy check means 1072 which receives the authorization request from the GMLC 102 to perform a first privacy check using the privacy profile stored in the memory 1071. If the request is verified by the first privacy check, the location information type of the request is examined.

If the client is requesting current location information, the first privacy check means 1072 instructs the notification/verification means 1024 to determine if notification/verification is required. Notification/verification means 1024 acquires the identifier of SGSN/MSC 103 from the HLR/HSS 106 and sends a location request (and a notification/verification message if required) to the identified SGSN/MSC to obtain location information of the target UE (with or without a verification report). The obtained location information is supplied to a privacy check request means 1028 of the GMLC 102. In response, the privacy check request means 1028 transmits an authorization request to a second privacy check means 1075 of the PPR to authorize it to perform a second privacy check using the UE's privacy profile stored in the memory 1071. If the request for the current location information is verified by the second privacy check, the second privacy check means 1075 permits the privacy check request means 1028 of GMLC 102 to transmit the current location information which has been received from the SGSN/MSC 103 to the client terminal 101 via the report transmit means 1026.

If the client terminal 101 is requesting last known location information of the target UE, the privacy check means 1072 of the PPR allows the reusability check means 1073 to perform a reusability test on the "age and place" data of the location request to determine whether the requested last known location information is available in the memory 1071. If this is the case, the reusability check means 1073 transmits information to the notification/verification means 1024, indicating whether or not notification/verification is required. If notification/verification is required, the notification/verification means 1024 transmits a notification/verification message to the SGSN/MSC 103. Privacy check request means 1028 responds to a verification report from the SGSN/MSC 103 by checking it to see if second privacy check should proceed. If so, it sends an authorization request to a second privacy check means 1075 of PPR 107 to authorize it to perform a second privacy check by using the privacy profile of the target UE and returns a privacy check report to the GMLC 102 from report transmit means 1076. If the second privacy check verifies the request, the report transmit means 1076 transmits a copy of the last known location information of the target UE from the memory 1071 to the GMLC 102, which is repeated by the report transmit means 1026 to the client terminal 101.

If any of the results of the two privacy checks and the reusability check is unfavorable, an error report will be transmitted from the report transmit means 1076 to the GMLC 102 and repeated by the report transmit means 1026 to the client terminal 101.

In FIG. 7B, the privacy profile and location report of the target UE terminal 105 are respectively maintained by the PPR 107 and the GMLC 102. Client check means 1027 performs a client check on the received location request. If the request is verified, the client check means 1027 transmits an authorization request to the PPR 107 to authorize it to perform a first privacy check. PPR 107 includes a privacy check means 1077 which references the privacy profile of the UE terminal 105 and performs a privacy check using the referenced privacy profile. If the request is not verified, the privacy check means 1077 transmits an error message to the GMLC 102 from report transmit means 1076 to the client terminal 101. If the request is verified, the privacy check means 1077 requests the client check means 1027 of the GMLC to examine the type of location information of the location request.

If the client is requesting current location information, the client check means 1027 of the GMLC instructs the notification/verification means 1024 to acquire the identifier of the SGSN/MSC 103 from the HLR/HSS 106 and transmits a location request to the SGSN/MSC 103. Location information obtained by the SGSN/MSC 103 is transmitted to the privacy check request means 1028. If notification/verification by the UE terminal is required, a notification/verification message is sent with the location request and a verification report will be received by the privacy check request means 1028. In response to the location information, the privacy check request means 1028 sends an authorization request to the privacy check means 1077 of the PPR to authorize it to perform a second privacy check. If the request is verified by the second privacy check, the privacy check means 1077 allows the privacy check request means to transmit the received current location information to the client terminal 101 via the report transmit means 1026.

If the client terminal 101 is requesting last known location information of the target UE, the client check means 1027 of the GMLC allows the reusability check means 1023 to perform a reusability test on the "age and place" data of the location request to determine whether the requested last known location information is available in the memory 1021. If this is the case, the reusability check means 1023 instructs the notification/verification means 1024 to check to see notification/verification is required. If notification/verification is required, the notification/verification means 1024 transmits a notification/verification message to the SGSN/MSC 103 to receive a verification report. Privacy check request means 1028 responds to the verification report by checking it to see if second privacy check should proceed. If so, it sends an authorization request to the privacy check means 1077 to authorize it to perform a second privacy check by using the privacy profile of the target UE and returns a privacy check report to the GMLC 102. If the request is verified by the second privacy check means 1077, the report transmit means 1026 is directed to transmit a copy of the last known location information of the target UE from the memory 1021 to the GMLC 102 to the client terminal 101.

Seventh Network Configuration

Figure 8A:
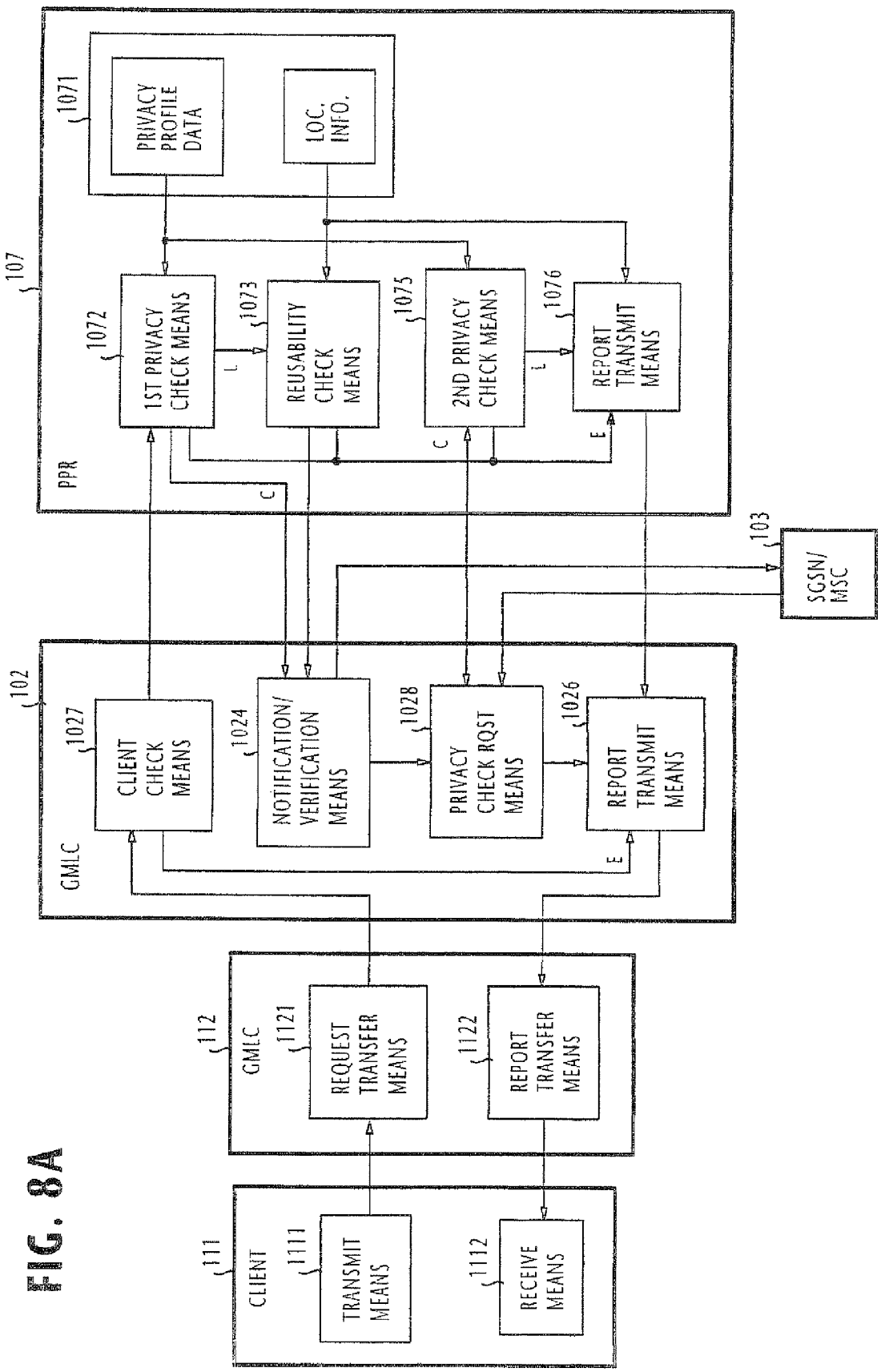
FIGS. 8A and 8B are block diagrams useful for describing a seventh network configuration of the present invention.
Figure 8B:
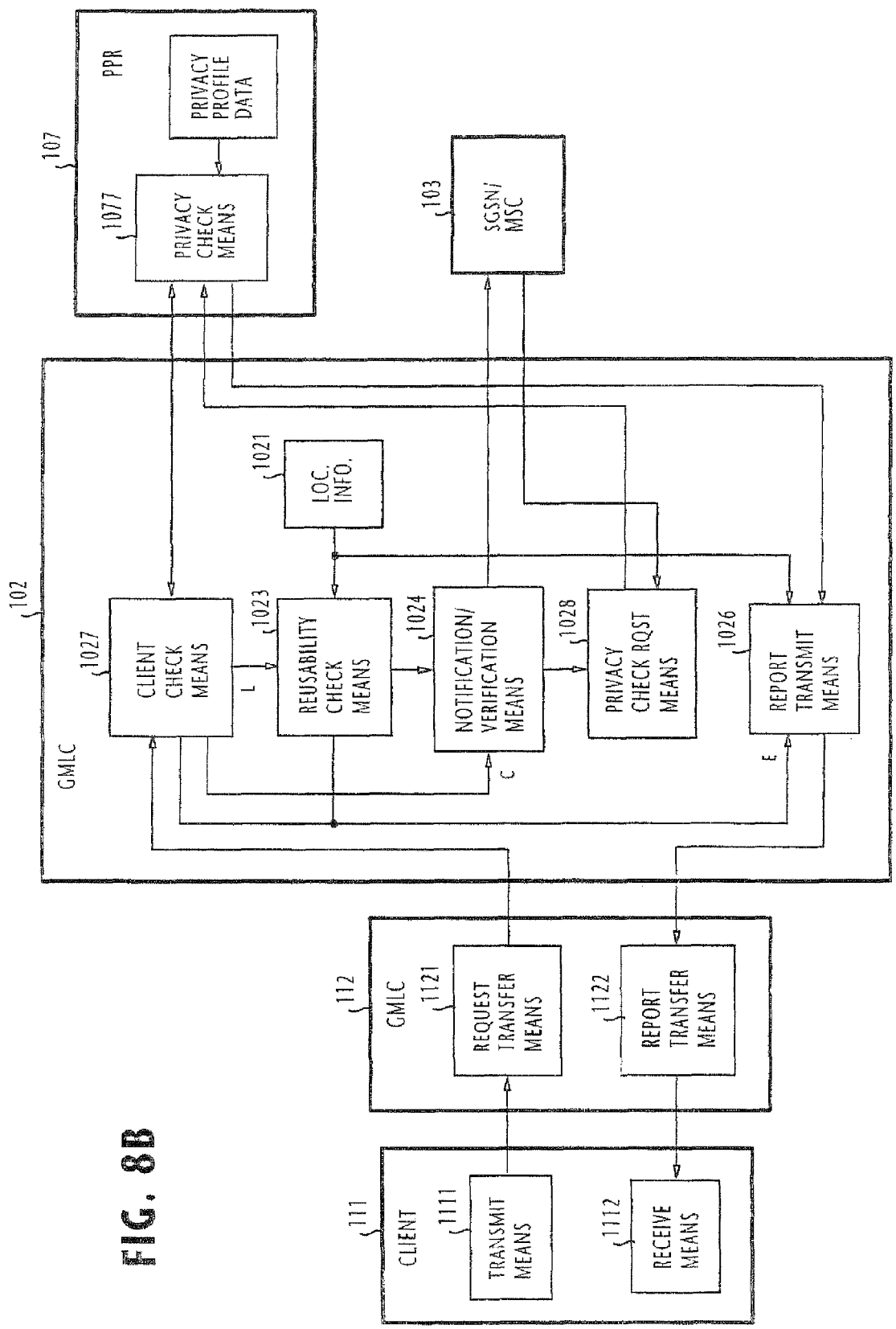

The seventh network configuration is shown in FIGS. 8A and 8B in which the client terminal 111 is the requesting terminal and the target UE terminal 105 is currently establishing its link to the home network A.

In FIG. 8A, the privacy profile and location information of the target UE terminal 105 are both maintained in the PPR 107. Client terminal 111 includes a transmit means 1111 for transmitting a location request to the home GMLC 112 and a receive means 1112 for receiving a location report from the GMLC 112. GMLC 112 includes a request transfer means 1121 which identifies the GMLC 102 as a node that maintains the privacy profile and location information of the target UE 105 by acquiring its node identifier from the home HLR/HSS 106 of the target UE. GMLC 112 includes a report transfer means 1122 for repeating a location report from the GMLC 102 to the client terminal 111.

GMLC 102 and PPR 107 are of identical configuration to that shown in FIG. 7A and hence they operate in the same manner as that of FIG. 7A on the location request repeated by the GMLC 112.

In FIG. 8B, the privacy profile and location information of the target UE terminal 105 are respectively maintained in the GMLC 102 and PPR 107.

Similar to FIG. 8A, the client terminal 111 transmits a location request to the home GMLC 112 and receives a location report from the GMLC 112. GMLC 102 and PPR 107 are of identical configuration to that shown in FIG. 7B and hence they operate in the same manner as that of FIG. 7B on the location request repeated by the GMLC 112.

Eighth Network Configuration

Figure 9A:
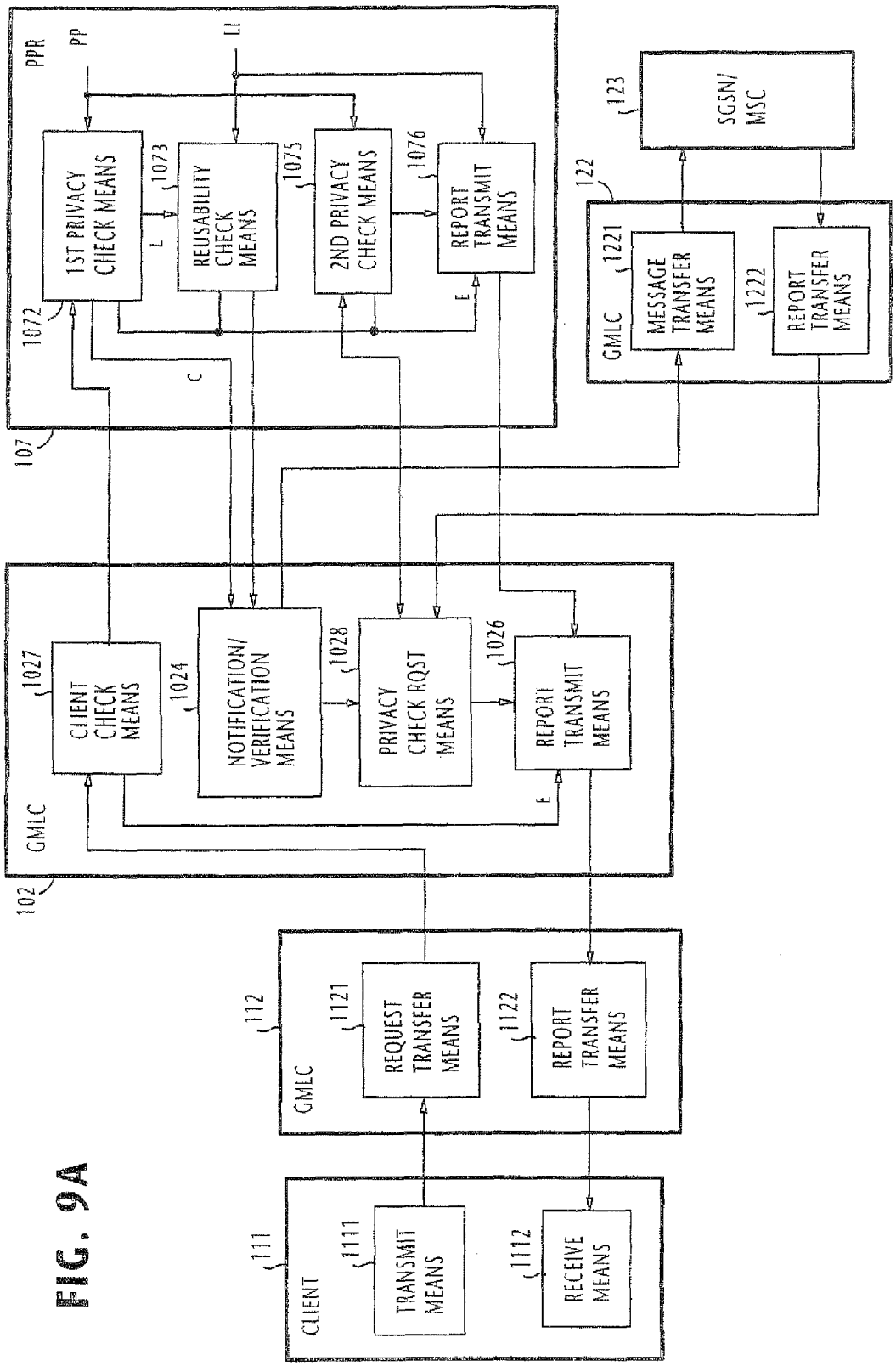
FIGS. 9A and 9B are block diagrams useful for describing an eighth network configuration of the present invention.
Figure 9B:
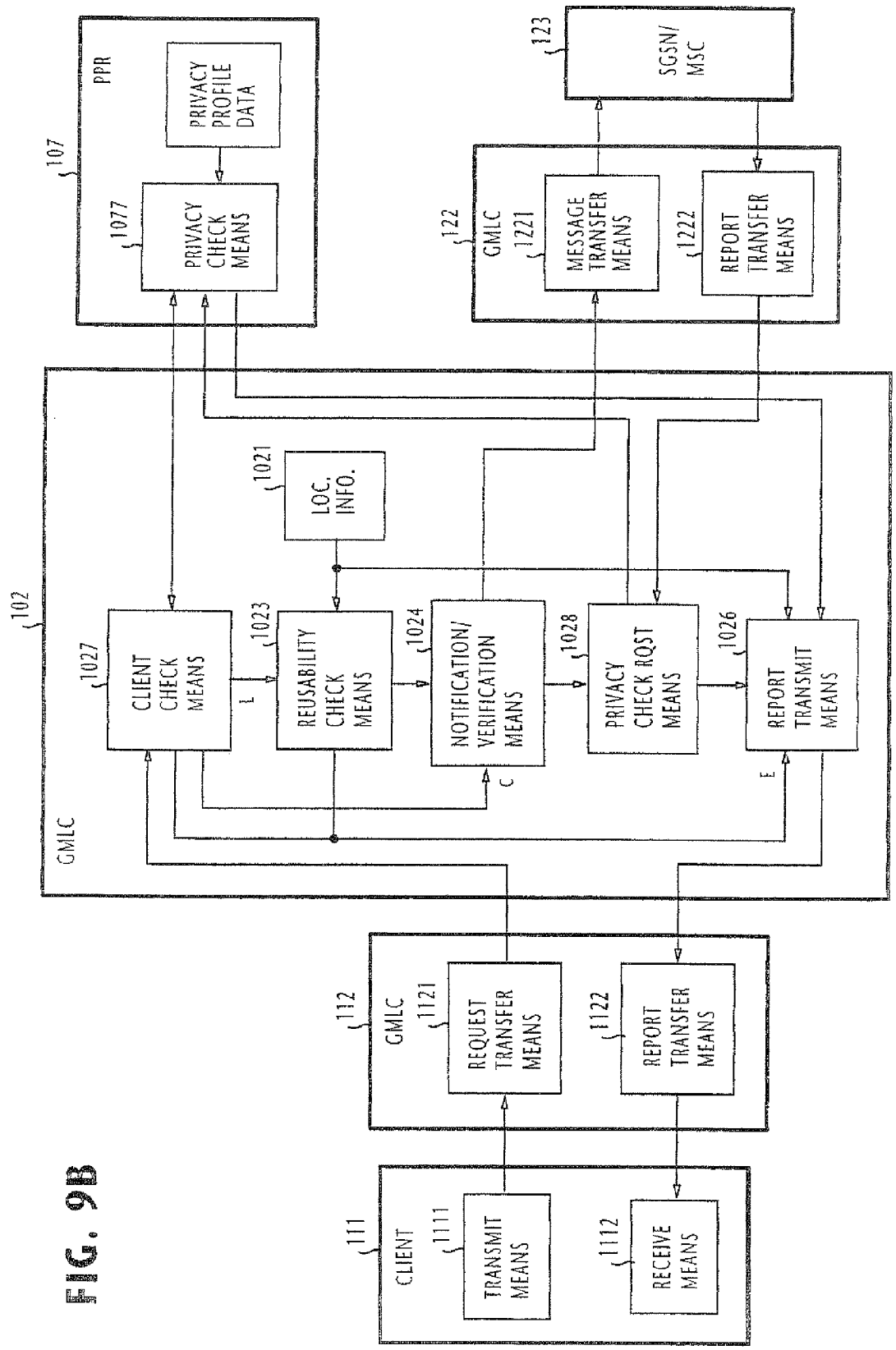

The eighth network configuration is shown in FIGS. 9A and 9B in which the client terminal 111 is the requesting terminal and the target UE terminal 105 is currently visiting the external network C.

In FIG. 9A, the privacy profile and location information of the target UE terminal 105 are both maintained in the PPR 107. Client terminal 111 transmits a location request to the home GMLC 112 and receives a location report from the GMLC 112. GMLC 112 includes request transfer means 1121 which identifies the GMLC 102 as a node that maintains the privacy profile and location information of the target UE 105 by acquiring its node identifier from the home HLR/HSS 106 of the target UE. GMLC 112 includes report transfer means 1122 for repeating a location report from the GMLC 102 to the client terminal 111.

Since the target UE is visiting the network C, the notification/verification means 1024 acquires the identifiers of GMLC 122 and SGSN/MSC 123 from the HLR/HSS 106 when instructed from the PPR 107 and sends a location request and notification/verification message to the SGSN/MSC 123 via the message transfer means 1221 of GMLC 122 and receives a location report and verification report via the report transfer means 1222 of GMLC 122.

In FIG. 9B, the privacy profile and location information of the target UE terminal 105 are respectively maintained in the GMLC 102 and PPR 107.

The operation of FIG. 9B is similar to FIG. 8B with the exception that location report and verification report are obtained from the SGSN/MSC 123 via the GMLC 122.

Ninth Network Configuration

Figure 10A:
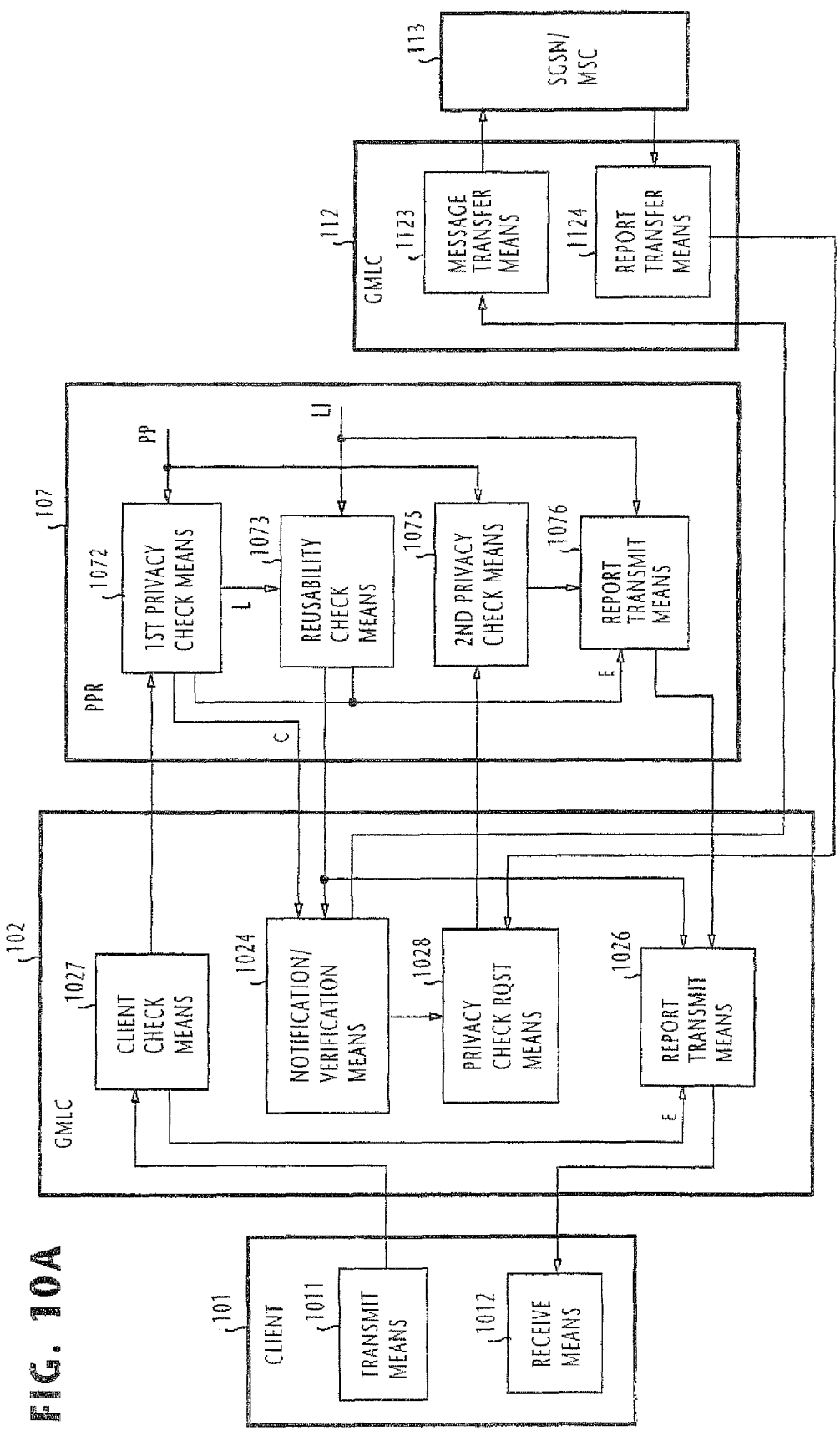
FIGS. 10A and 10B are block diagrams useful for describing a ninth network configuration of the present invention.
Figure 10B:
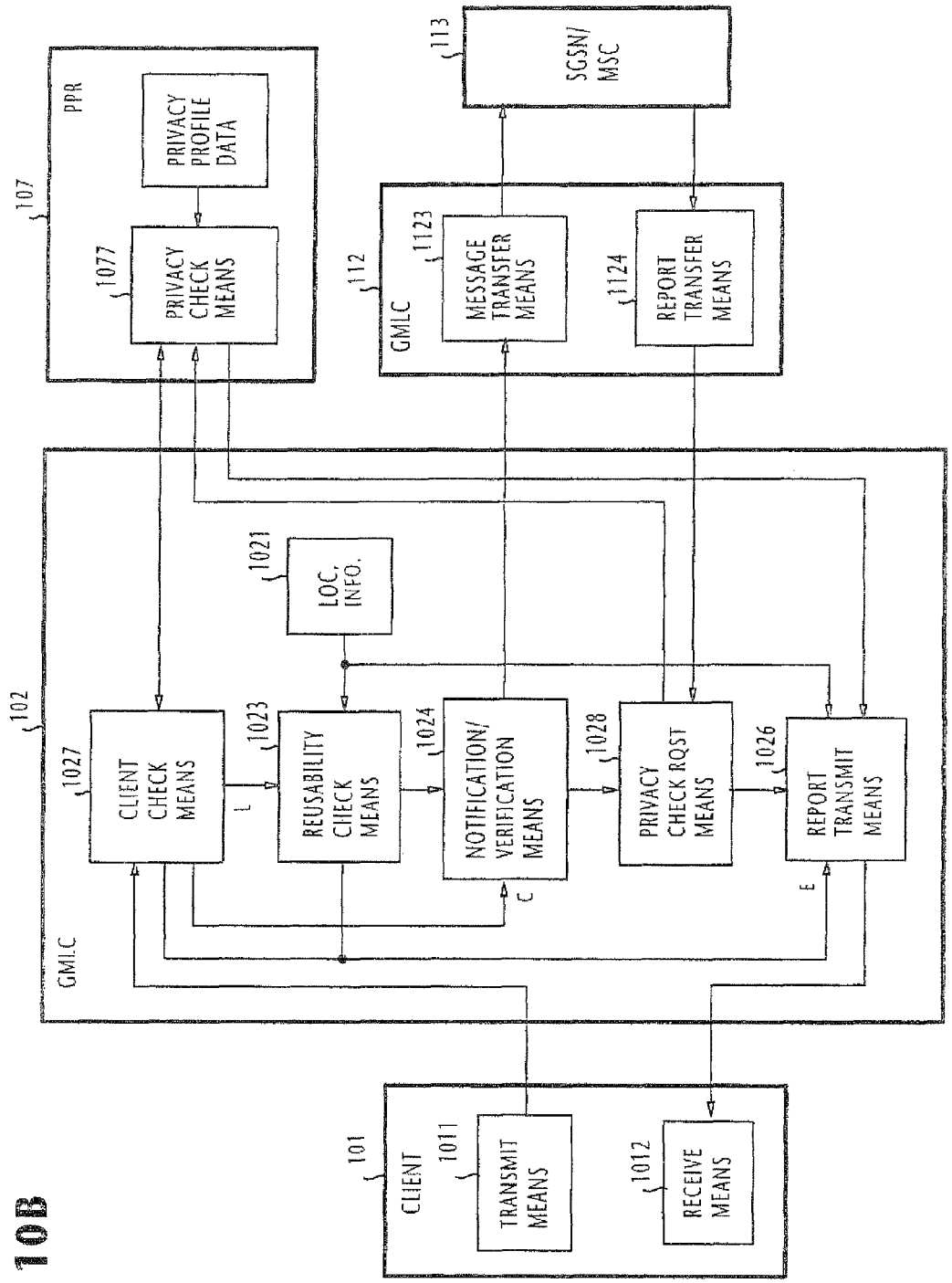

The ninth network configuration is shown in FIGS. 10A and 10B in which the client terminal 101 is the requesting terminal and the target UE terminal 105 is currently visiting the external network B.

In FIG. 10A, the privacy profile and location information of the target UE terminal 105 are both maintained in the PPR 107. Client terminal 101 transmits a location request to the home GMLC 102 and receives a location report from the GMLC 102. Since the target UE is visiting the network B, the notification/verification means 1024 of GMLC 102 acquires the identifiers of GMLC 112 and SGSN/MSC 113 from the HLR/HSS 106 when instructed from the PPR 107 and sends a location request and notification/verification message to the SGSN/MSC 113 via the message transfer means 1123 of GMLC 112 and receives a location report and verification report via the report transfer means 1124 of GMLC 112.

In FIG. 10B, the privacy profile and location information of the target UE terminal 105 are respectively maintained in the GMLC 102 and PPR 107.

The operation of FIG. 10B is similar to FIG. 8B with the exception that location report and verification report are obtained from the SGSN/MSC 113 via the GMLC 112.

Tenth Network Configuration

Figure 11A:
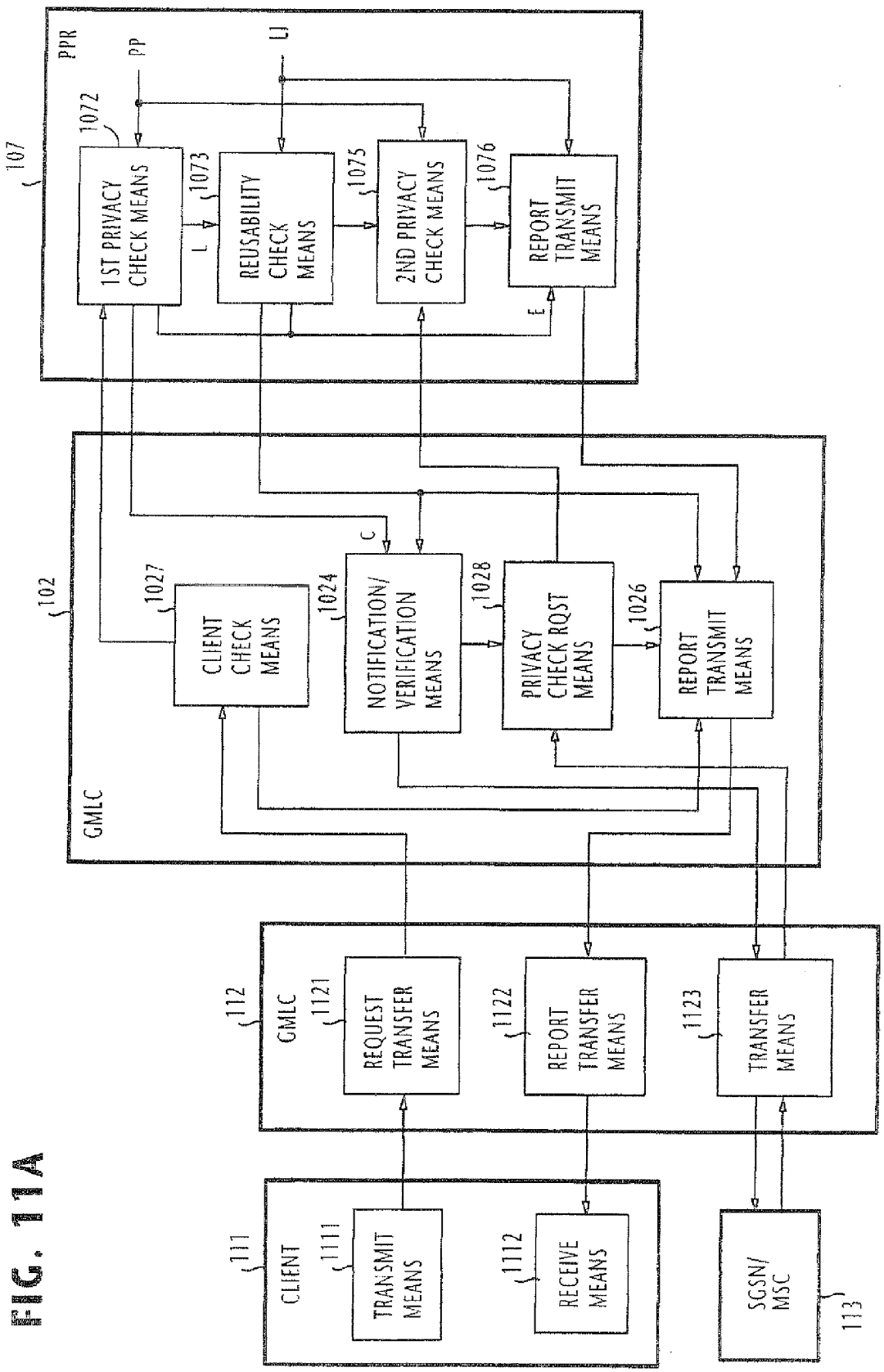
FIGS. 11A and 11B are block diagrams useful for describing a tenth network configuration of the present invention.
Figure 11B:
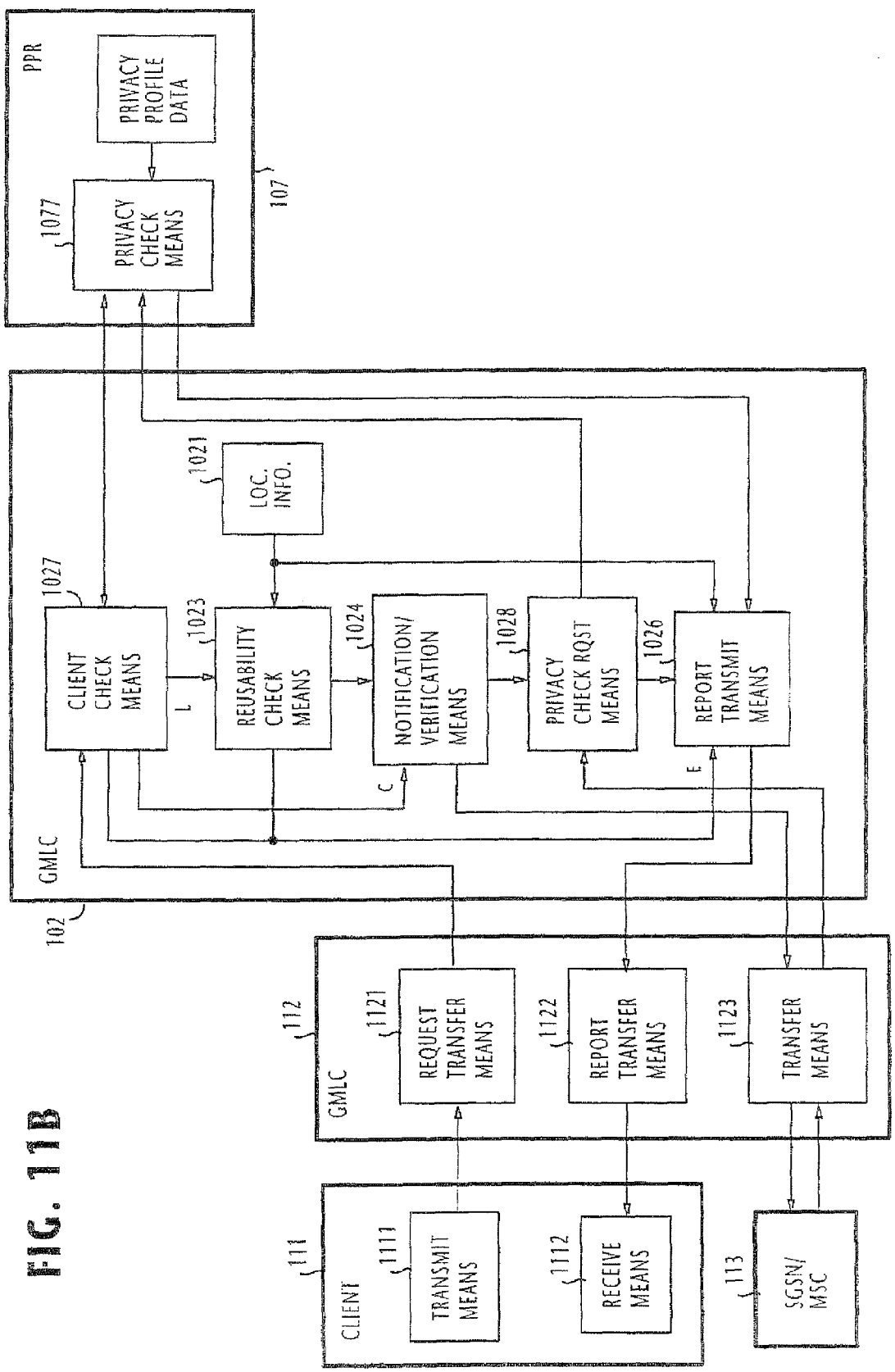

The ninth network configuration is shown in FIGS. 11A and 11B in which the client terminal 111 is the requesting terminal and the target UE terminal 105 is currently visiting the external network B.

In FIG. 11A, the privacy profile and location information of the target UE terminal 105 are both maintained in the PPR 107. Client terminal 111 transmits a location request to the home GMLC 112 which repeats the request to the GMLC 102 after acquiring its identifier from the HLR/HSS 106. Client terminal 111 receives a location report from the GMLC 102 via the home GMLC 112. Since the target UE is visiting the network B, the notification/verification means 1024 of GMLC 102 acquires the identifiers of GMLC 112 and SGSN/MSC 113 from the HLR/HSS 106 when instructed from the PPR 107 and sends a location request and notification/verification message to the SGSN/MSC 113 via the message transfer means 1123 of GMLC 112 and receives a location report and verification report via the report transfer means 1124 of GMLC 112.

In FIG. 11B, the privacy profile and location information of the target UE terminal 105 are respectively maintained in the GMLC 102 and PPR 107.

The operation of FIG. 11B is similar to FIG. 8B with the exception that location report and verification report are obtained from the SGSN/MSC 113 via the GMLC 112.

DESCRIPTION OF PREFERRED EMBODIMENTS

The MT-LR operation of a local GMLC proceeds according to flowcharts shown in FIGS. 12A to 12E if the GMLC holds the privacy information of its home UE terminals.

In FIG. 12A, when the local GMLC receives a message from a client terminal or from the network, the routine starts with decision step 201 to examine the type and source of the message to determine whether the message is a location request from a client terminal, a location request repeated from other GMLC, or the message contains an SGSN/MSC identifier from an HLR/HSS. If the message is a location request from client terminal, flow proceeds to step 202 to perform a client check to verify the requesting client terminal for agreement with the privacy profile of the target UE maintained in the local GMLC. If the location request is not verified at step 202, an error message is transmitted to the requesting terminal (step 223) and the routine is terminated.

If the requesting client is verified (step 202) or the received message is a location request from other GMLC (step 201), flow proceeds to step 204 to determine whether the local GMLC is the home GMLC of the target UE. If this is the case, flow proceeds to decision step 205 to check to see if a PPR (Privacy Profile Register) is connected to the GMLC.

If no PPR is connected to the local GMLC, a first privacy check is performed on the location request for agreement with the privacy profile of the target UE terminal (step 206) to determine if the location request is acceptable (step 207).

The first privacy profile of a UE terminal may include grant/reject indication of whether or not the client terminal is acceptable, or whether or not the requested accuracy of location information is acceptable, or whether or not the requested age of last known location information is acceptable. The first privacy profile may further include an indication of whether the UE terminal user is desirous of notification from the client terminal or verification by the UE terminal as a criteria for the acceptance of a location request. If a UE user desires notification from the requestor, the UE user will receive a notification from the network indicating that the UE terminal is being the target of a location request. If a UE user desires verification, the user will receive a verification message from the network indicating whether the current location request should be accepted or not. The UE terminal responds to the verification message with a verification report.

If first privacy check step 207 determines that the received location request is not acceptable, flow proceeds to step 223 to transmit an error message to the requesting terminal. If the location request is acceptable, flow proceeds to step 208 to perform a check on the type of location information contained in the received location request to determine which of the parameters (C, L, C/L and L/C) is specified in the request (step 209). If the type of location information specifies last known (L) or "last known or current (L/C) location information" (indicating that the client user desires last known location information but satisfies with it if current location information is not available), flow proceeds to step 210 to perform a check on the last known location information for reusability. If the requested "age and place" requirements of the location request meet the privacy profile of the target UE, a further check is made as to whether last known location information that fulfills the requirements is stored in memory (step 211).

If such last known location information is available, flow proceeds to step 212 to check to see if the privacy profile of the target UE indicates that notification to or verification by the target UE is required. If this is the case, flow proceeds to step 213 to send an enquiry message to an HLR/HSS for requesting the identifier of a SGSN/MSC responsible for the target UE terminal. If no response is received from the HLR/HSS, an error message is sent to the client terminal (step 223). When a response message is received from the HLR/HSS (step 214), the GMLC proceeds to step 215 to examine its contents and transmits a notification/verification message to the identified SGSN/MSC if the response message contains only SGSN/MSC identifier. If the response message from the HLR/HSS contains the identifier of a GMLC in addition to an SGSN/MSC identifier, the GMLC sends the notification/verification message to the identified GMLC. If the privacy profile of the target UE requires only notification (step 216), flow proceeds to step 218. Otherwise, flow proceeds to step 217 to check to see if a verification report from the UE terminal indicates that the requesting client terminal is verified. If the decision is negative at step 217, flow proceeds to step 223 to send an error message to the requesting terminal. If the decision at step 217 is affirmative, flow proceeds to step 218 to determine if the GMLC is connected to a PPR.

If no PPR is connected to the GMLC (step 218), flow proceeds to step 219 to perform a second privacy check on the current or last known location information to determine whether its time of location estimation and its estimated location agree with allowed "time-zone and area" parameters of the UE's privacy profile (step 220). If the result of the second privacy check is unfavorable (step 220), an error message is transmitted to the client terminal (step 223). Otherwise, the location information is processed according to the UE's privacy profile if the accuracy of the location information is higher than the allowed accuracy (step 221). At step 222, the location information (current or last known) is transmitted to the client terminal. If the location information is current and a copy of the current location information is stored in memory as last known location information.

If no notification/verification is required by the UE terminal, the decision at step 212 is negative and flow proceeds to step 219 to perform second privacy check, skipping steps 214 through 218.

If current (C or C/L) location information is specified in the received location request (step 209) or last known location information is not available (step 211), flow proceeds to step 231 (FIG. 12B) to transmit an enquiry message to the home HLR/HSS for requesting the identifier of a SGSN/MSC responsible for the target UE terminal. When the requested identifier is received (step 232), flow proceeds to step 233 to check to see if the privacy profile of the target UE indicates that notification/verification is required. If not, a location request is sent to the home or external SGSN/MSC depending on the current location of the target UE to obtain its current location information. When the requested current location information is received (step 235), flow returns to step 218. If there is no response, an error message is transmitted to the requesting terminal (step 223). If the decision at step 233 is affirmative, flow proceeds to step 236 to transmit a location request and notification/verification request message to the home or external SGSN/MSC depending on the current location of the target UE for receiving a response (step 237). If the current location information of the target UE and a verification report is received, flow proceeds from step 237 to step 217. If no response is received, flow proceeds from step 237 to step 223 to send an error message to the client terminal.

If the decision at step 204 indicates that the local GMLC is not the home GMLC of the target UE, flow proceeds to step 241 (FIG. 12C) to send an enquiry message to the external HLR/HSS, which is the home HLR/HSS of the external target UE, to obtain the identifier of an appropriate GMLC. When the identifier of the appropriate GMLC is obtained, a location request is transmitted to the identified GMLC to obtain the location information of the target UE. If the location information is received successfully, flow proceeds to step 222 to repeat the received location information to the requesting terminal. If no response is returned, an error message is sent to the requesting terminal (step 223).

If the decision at step 201 indicates that a message such as notification/verification message, verification report, location request, or location report is received from other GMLC, flow proceeds from step 201 to step 251 (FIG. 12D) to repeat the received message to downstream node identified by a SGSN/MSC (or plus GMLC) identifier contained in the message.

Figure 12B:
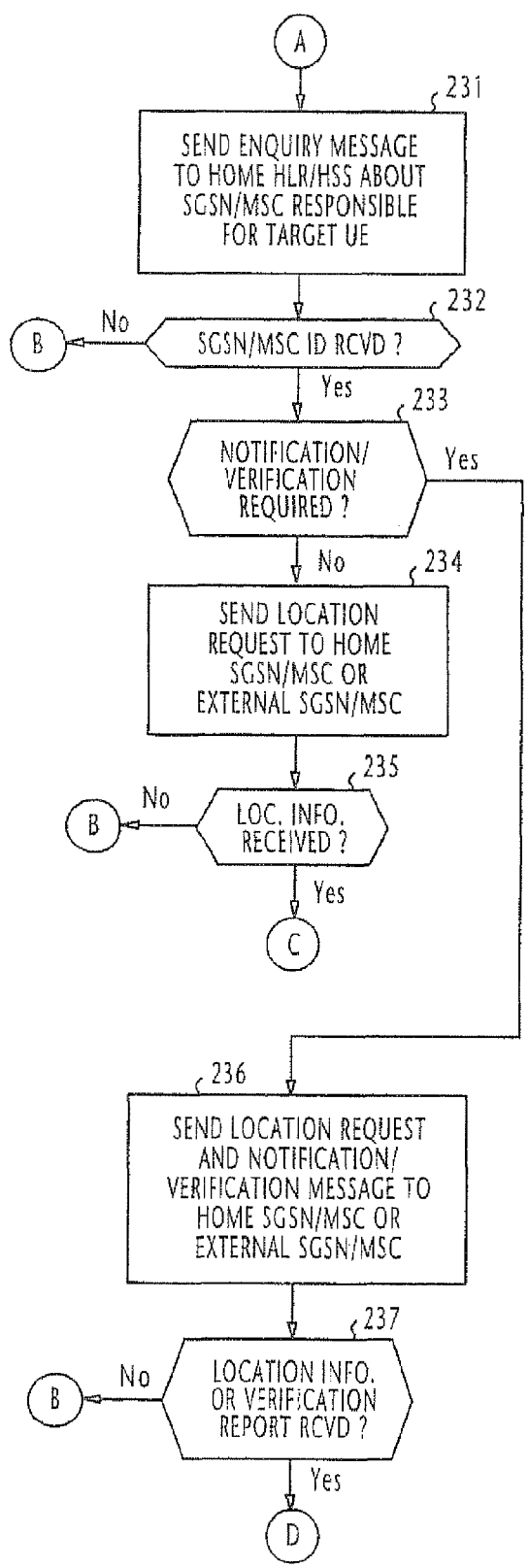

If a PPR is connected to the local GMLC, the decision at step 205 is affirmative and flow proceeds to step 224 to send an authorization request (for privacy check with or without a location-info-type check) to the PPR to obtain a report. The PPR performs a first privacy check on the location request and additionally an information-type check with an attendant reusability test on stored location information of the target UE if the PPR maintains location information of mobile terminals. At step 225, the GMLC receives a report from the PPR indicating a result of the first privacy check and a result of the reusability test. Step 225 analyzes the received report. If the result of the first privacy check is favorable and no reusability test is performed (a), flow proceeds to step 208. Otherwise, flow proceeds to step 223 to send an error message to the requesting terminal. If the results of the first privacy check and reusability test are both favorable (b), flow proceeds to decision step 212. If the result of the first privacy check is favorable, but the result of the reusability test is unfavorable (c), flow proceeds to step 231 (FIG. 12B).

If the decision at step 218 is affirmative, flow proceeds to step 261 (FIG. 12E) to send a request to the PPR for requesting it to perform a second privacy check. At step 262, a report indicating a result of the second privacy check is received from the requested PPR and the result is analyzed. If the result indicates a favorable decision, flow proceeds from step 262 to step 222 to transmit the location information of the target UE to the requesting terminal. If the report from the PPR indicates an error at step 262, flow proceeds to step 223 to send an error message to the requesting terminal or GMLC.

Figure 12C:
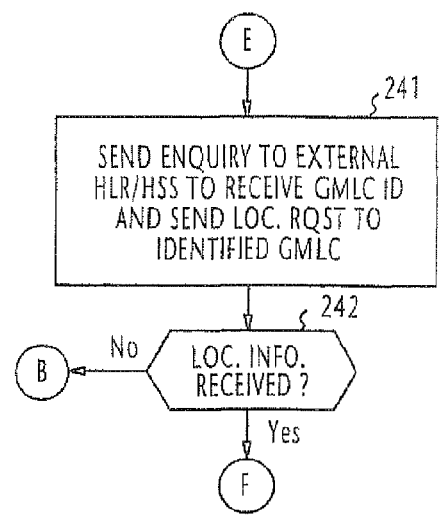
Figure 12D:
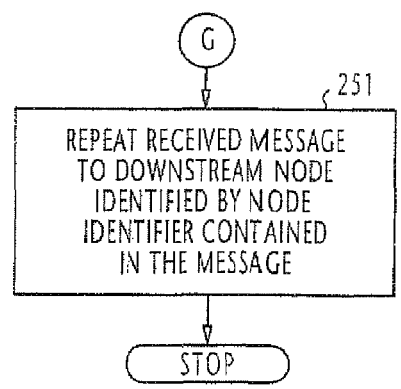
Figure 12E:
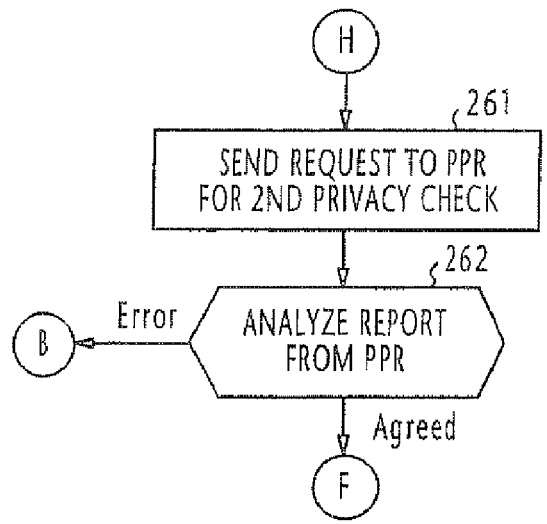
Figure 12F:
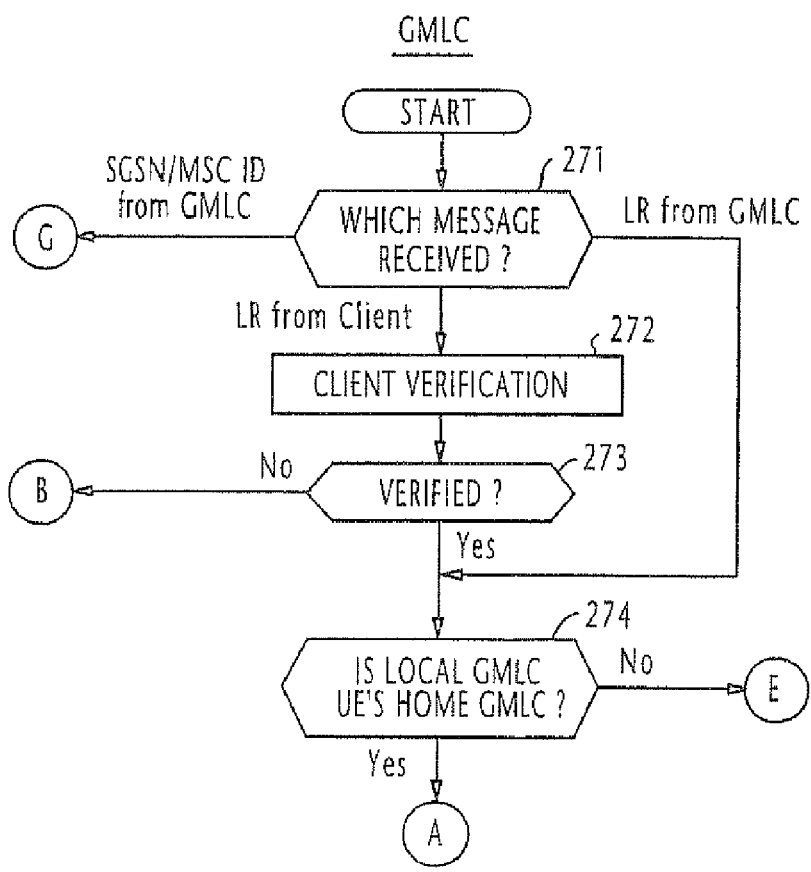
FIG. 12F is a flowchart of a local GMLC which does not maintain the privacy information of its home UE terminals.

If the privacy information of home UE terminals is not maintained in the local GMLC, the MT-LR operation of the GMLC proceeds according to the flowchart of FIG. 12F and the home SGSN/MSC of target UE terminal operates according to the flowchart of FIG. 13.

In FIG. 12F, the routine starts with step 271 to check the type and source of a message when it arrives on the local GMLC. If the message is a location request from a client terminal, flow proceeds to step 272 to perform a client check. If the client terminal is verified (step 273), flow proceeds to step 274 to check to see if the local GMLC is the home GMLC of the target UE. If so, flow proceeds to step 231 (FIG. 12B). Otherwise, flow proceeds to step 241 (FIG. 12C). If the message is a location request from other GMLC, steps 272, 273 are skipped and step 274 is executed. If the message contains a node identifier, flow proceeds from step 271 to step 251 to repeat the message downstream.

The MT-LR operation of the SGSN/MSC of the present invention will be described below with reference to the flowchart of FIG. 13.

The routine of a SGSN/MSC begins with the reception of a message either from a GMLC or a mobile UE terminal (step 300). If the location request is transmitted from a GMLC and the SGSN/MSC maintains location reports and private profiles of UE terminals (step 301), flow proceeds to step 302 to perform a privacy check for agreement with the first privacy profile of the target UE. If the request is acceptable, flow proceeds to step 304 to check the location information type of the request. If the request is not acceptable (step 303), an error message is returned to the requesting GMLC (step 315).

If the location reports and private profiles of UE terminals are not maintained by the SGSN/MSC, flow proceeds to step 331 to transmit a location request to the RAN and repeats a location report from the RAN to the requesting GMLC (step 332).

If the decision at step 300 indicates that the location request is transmitted from a UE terminal, flow proceeds to step 304, skipping steps 302 and 303.

If the location request specifies last known location information of the target UE (step 304), a reusability test is provided (steps 306, 307). If the result of the reusability test at step 307 is unfavorable, flow proceeds to step 308 to transmit a location request to the associated RAN to obtain the current location information of the target UE (steps 308, 309). If no response is received, an error message is transmitted to the requesting source (step 315).

If the decision at step 307 or 309 is affirmative, flow proceeds to step 310. If the location request has been received from a GMLC, flow proceeds to step 311 to perform a privacy check for agreement with a second privacy profile of the target UE terminal (step 312). If the result of the privacy check is unfavorable, an error message is returned to the requesting source (step 315). Otherwise, flow advances to step 313 to process the location information according to the privacy profile if the accuracy of the location information (either current or last known) is higher than the allowed accuracy. The processed location information is then transmitted to the requesting source (step 314). If the location request has been received from a UE terminal, flow proceeds from step 310 to step 314 to transmit the location information to the requesting UE terminal.

If the SGSN/MSC receives a notification/verification message from a GMLC (step 300), flow proceeds to step 320 to check to see if notification or verification is requested. If notification is requested, flow proceeds to step 321 to send a notification message to the target UE and terminates the routine. If verification by the target UE is requested, flow proceeds to step 322 to send a verification message to the target UE. In response, the target UE checks the requesting terminal and sends a verification report to the SGSN/MSC. This report is repeated by the SGSN/MSC to the requesting GMLC (step 323).

Figure 14:
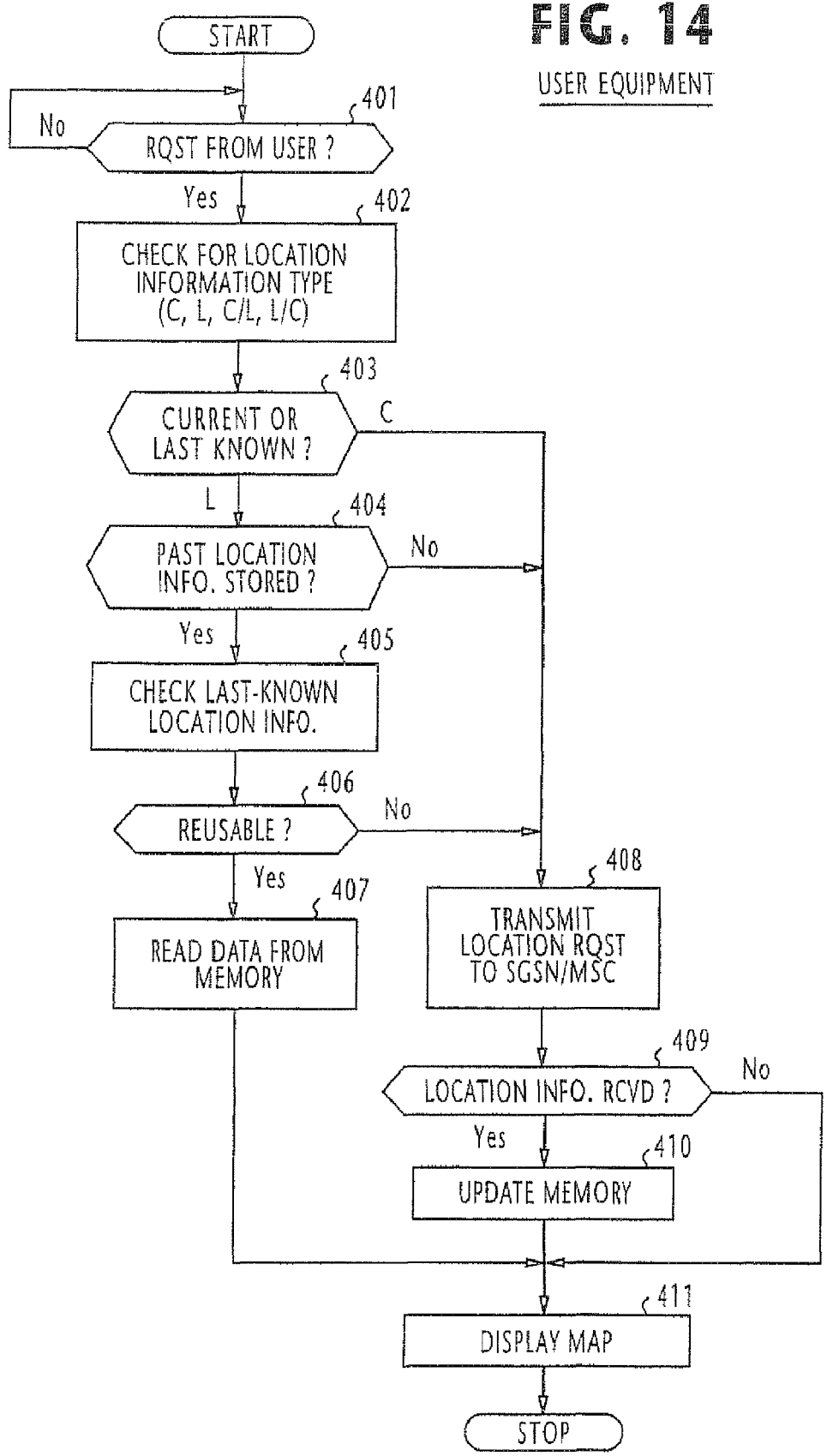
FIG. 14 is a flowchart of the operation of a mobile terminal of the present invention.

The MO-LR operation of the mobile UE terminal of the present invention proceeds according to a flowchart shown in FIG. 14.

The routine of a mobile UE terminal starts with step 401 when the user of the UE enters a request to the terminal for requesting a location information of its own terminal. The entered request data specifies one of the types of location information as described above. At step 402, the UE terminal checks the entered type of location information and determines which type is specified (step 403). If the last known location information is requested, flow proceeds to step 404 to determine whether past location information is stored in the memory 1052 (FIG. 2A) of the UE terminal. If the decision is affirmative at step 404, flow proceeds to step 405 to check the stored last known location information for reusability (step 406). If the stored information satisfies the privacy profile of the UE terminal, the stored location information is determined to be reusable and the stored information is read (step 407) and displayed on a map (step 411). If the decision at step 403 indicates that the entered request specifies current location of the UE terminal or if the decision at step 404 or 406 is negative, flow proceeds to step 408 to transmit a location request to a SGSN/MSC via a RAN. The location request is processed in the SGSN/MSC and location information is transmitted from the SGSN/MSC and received by the UE terminal at step 409. Depending on the type of location information specified in the transmitted location request message, the location information received from the SGSN/MSC is either last known or current location information of the requesting UE terminal. The memory of the UE terminal is updated with the received location information at step 410 and the received information is displayed (step 411).

Network Modes of Operation

The present invention operates in first to tenth network modes corresponding respectively to the first to tenth network configurations discussed previously. The following is a description of the network modes of operation using the flowcharts just described above.

First Network Mode

Figure 15A:
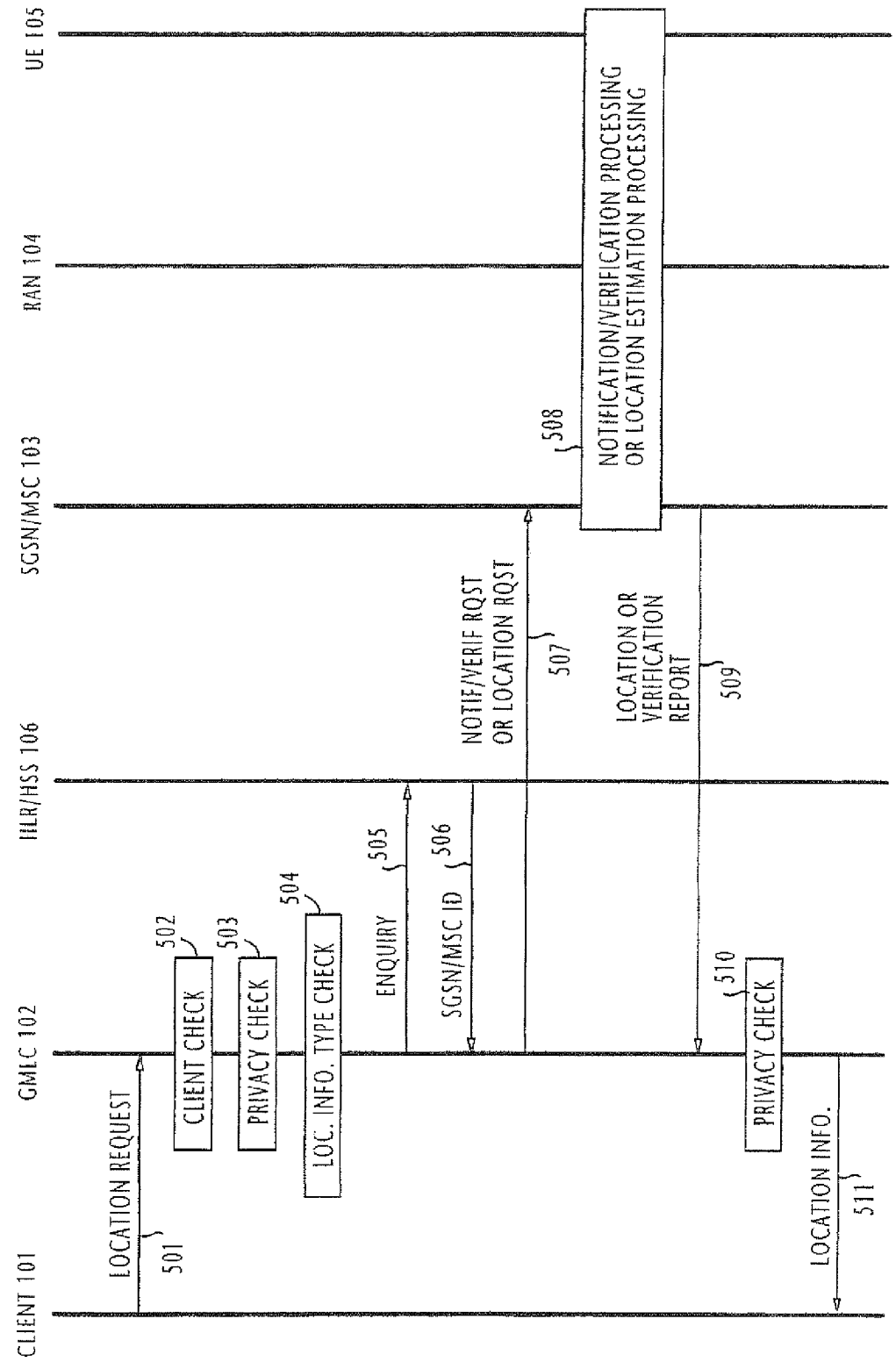

FIG. 15A is a sequence diagram illustrating a location network operating in MT-LR mode in which the client terminal 101 is the requesting terminal and the mobile terminal 105 is the target UE which is currently staying in the home network A. The home GMLC 102 of target UE maintains its privacy profile and location report. Client terminal 101 initially transmits a location request (event 501) to the home GMLC 102. In response, the GMLC 102 performs a client check (event 502), a privacy check (event 503) and a location information type check (event 504) by executing steps 200 through 211 of FIG. 12A. If the location request specifies current location information of the target UE and notification/verification is not required, steps 231 through 235 are executed by sending a location request to the SGSN/MSC 103 using its identifier acquired from HLR/HSS 106 (events 505, 506, 507).

If the location request specifies last known location information of the target UE and the stored information is reusable (step 211), and notification/verification is required (step 212), steps 213 through 215 are executed by sending a notification/verification request to the SGSN/MSC 103 using its identifier obtained from HLR/HSS 106 (events 505, 506, 507).

SGSN/MSC 103 executes steps 300, 320~23 in response to the notification/verification message (event 507) from the GMLC 102 or executes steps 300, 301, 331, 332 in response to the location request from the GMLC 102 (event 508) and transmits a location report or a verification report (event 509) to the GMLC 102. If verification report is received, the GMLC 102 checks to see if the target UE has verified the request (step 217). If the request is verified, the GMLC 102 performs a second privacy check (event 510) on the current or last known location information by executing steps 219 to 221 and transmits location information to the client terminal 101 (event 511).

FIG. 15B is a sequence diagram illustrating a location network operating in the MT-LR mode in which the client terminal 101 is the requesting terminal, the mobile terminal 105 is the target UE establishing its wireless link to the home network A, and the home SGSN/MSC 103 of target UE maintains its privacy profile and location report. Client terminal 101 transmits a location request (event 601) to the home GMLC 102. In response, the GMLC 102 executes steps 271~273 (FIG. 12F) to perform a client check (event 602). Being the home GMLC of the target UE, the GMLC 102 makes an affirmative decision at step 274 and executes steps 231, 232 (FIG. 12B) to acquire the identifier of SGSN/MSC 103 (events 603, 604) from HLR/HSS 106 and sends a location request to the SGSN/MSC 103 (event 605).

In response to the location request from GMLC 102, the SGSN/MSC 103 executes steps 300~307 to perform a first privacy check and information type check (events 606, 607) and executes steps 308, 309 to perform location estimation process (event 608) to obtain a location report. Second privacy check is performed (event 609) by the SGSN/MSC 103 by executing steps 310~313. The location report is then transmitted (step 314) to the GMLC 102 (event 610), which receives this location report (step 235, FIG. 12B) and repeats it to the client terminal 101 (step 222, FIG. 12A, event 611).

Figure 15C:
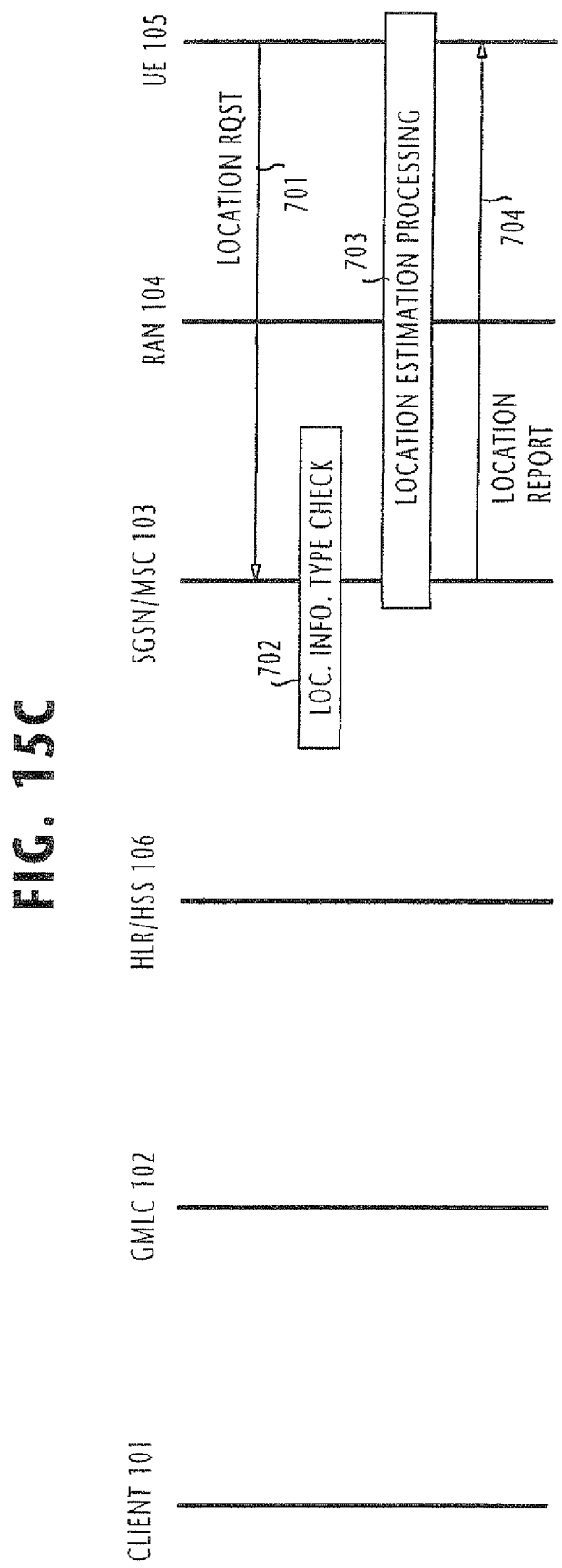

In FIG. 15C, the location network operates in MO-LR mode in which the UE terminal 105 transmits a location request to the SGSN/MSC 103 (event 701). SGSN/MSC 103 responds to this request by executing steps 300, 304 and 305 (FIG. 13) to perform an information type check (event 702). If the current location is specified in the location request, the SGSN/MSC 103 sends a location request to the RAN 104 (steps 308, 309, 310, 314) to provide a location estimation process (event 703). If last known location is specified in the location request, the SGSN/MSC 103 performs a reusability test (steps 306, 307) and sends a location report (event 704) to the UE terminal (steps 310, 314).

Second Network Mode

Figure 16:
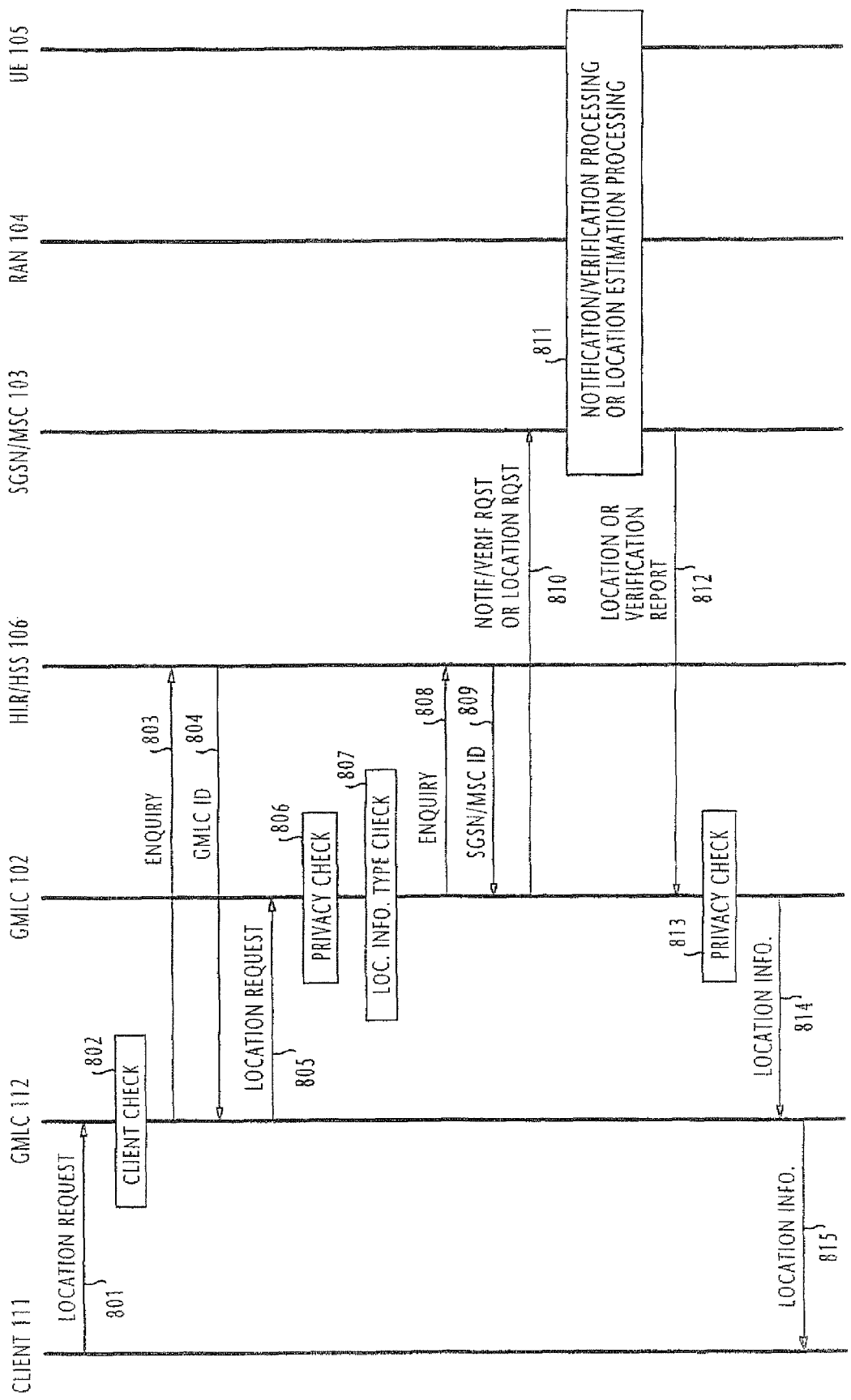
FIG. 16 is a sequence diagram associated with the second network mode of operation.

FIG. 16 is a sequence diagram illustrating a location network operating in the MT-LR mode in which the client terminal 111 is the requesting terminal, the mobile terminal 105 is the target UE which is currently staying in its home network A, and the home GMLC 102 of target UE 105 maintains its privacy profile and location report. Client terminal 111 initially transmits a location request (event 801) to the home GMLC 112. In response, the GMLC 112 executes steps 201~203 (FIG. 12A) to perform a client check (event 802). Since the privacy information of the target UE is not available, the GMLC 112 passes through steps 204, 205 and executes steps 241 and 242 (FIG. 12C) to acquire the identifier of GMLC 102 (events 803, 804) from the home HLR/HSS 106 of the target UE 105 and sends a location request to the GMLC 102 (event 805).

In response to the location request from GMLC 112, the GMLC 102 passes through steps 201, 204 and executes steps 206~211 to perform a first privacy check and information type check (events 806, 807) and executes steps 212~215 to obtain the identifier of SGSN/MSC 103 from HLR/HSS 106 (events 808, 809) and transmit a notification/verification message or a location request (event 810) to the SGSN/MSC 103. SGSN/MSC 103 performs its routine (event 811) and returns a location report or a verification report to the GMLC 102 (event 812). In response, the GMLC 102 executes steps 216~218 and then performs a second privacy check on the received location information (steps 219, 220, 221, event 813). The location report is then transmitted (step 222, event 814) to the requesting GMLC 112, which receives this location report (step 242, FIG. 12C) and repeats it to the client terminal 111 (step 222, FIG. 12A, event 815).

Third Network Mode

Figure 17:
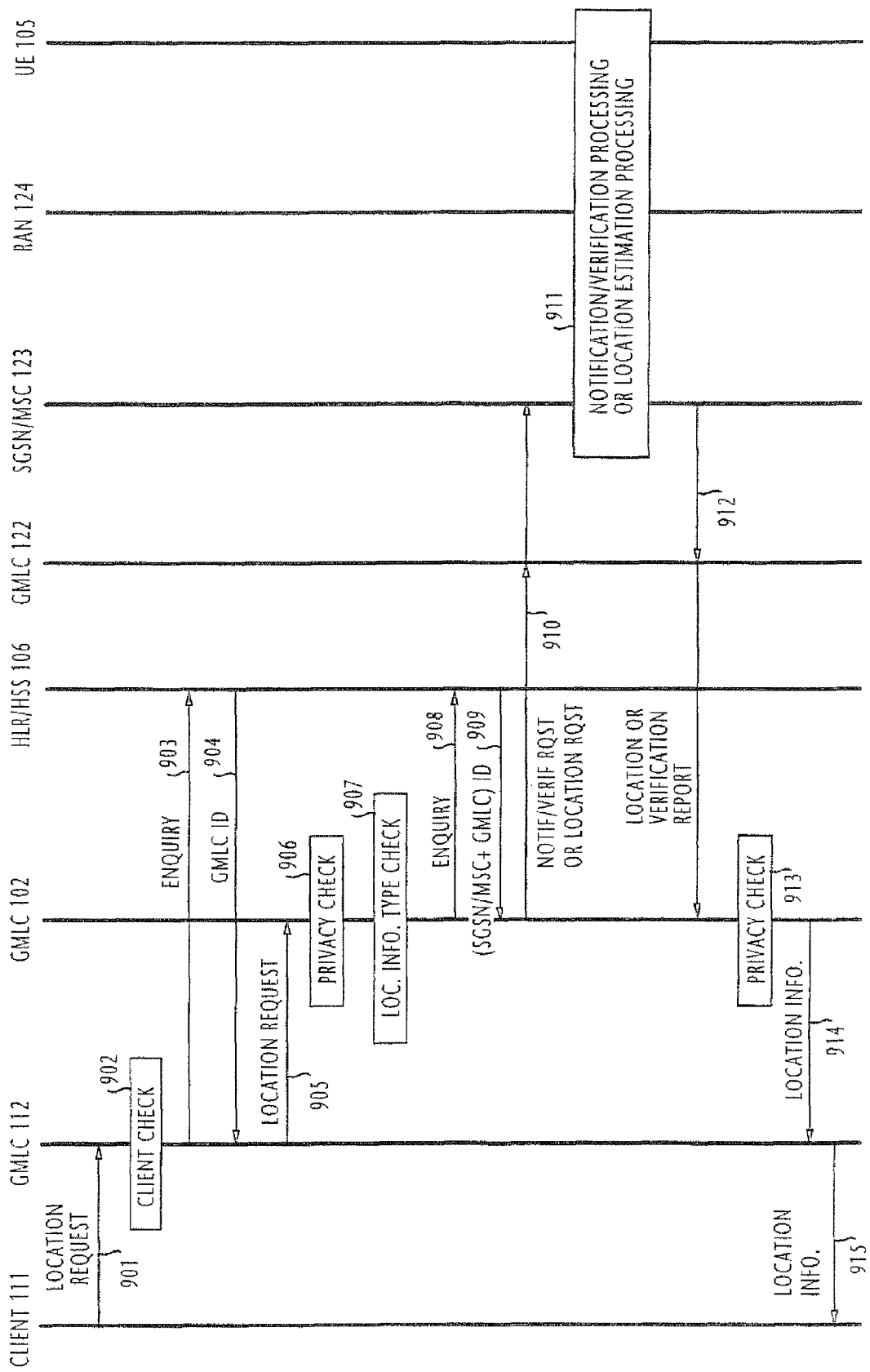
FIG. 17 is a sequence diagram associated with the third network mode of operation.

FIG. 17 is a sequence diagram illustrating a location network operating in the MT-LR mode in which the client terminal 111 is the requesting terminal, the mobile terminal 105 is the target UE which is currently visiting the external network C, and the home GMLC 102 of target UE 105 maintains its privacy profile and location report. Client terminal 111 initially transmits a location request 901 to the home GMLC 112. In response, the GMLC 112 executes steps 201~203 (FIG. 12A) to perform a client check 902. Since the privacy information of the target UE is not available, the GMLC 112 passes through steps 204, 205 and executes steps 241 and 242 (FIG. 12C) to acquire the identifier of GMLC 102 (events 903, 904) from the home HLR/HSS 106 of the target UE 105 and sends a location request 905 to the GMLC 102.

In response to the location request from GMLC 112, the GMLC 102 passes through steps 201, 204 and executes steps 206~211 to perform a first privacy check 906 and information type check 907 and executes steps 212~215 to obtain the identifiers of SGSN/MSC 123 and GMLC 122 from HLR/HSS 106 (events 908, 909). On receiving these identifiers, the GMLC 102 executes step 215 and transmits a notification/verification request or a location request 910 to the GMLC 122. Each of these requests contains the identifiers of SGSN/MSC 123 and GMLC 122. In response to the request message from the GMLC 102, the GMLC 122 passes through step 201 to step 251 (FIG. 12D) to repeat the received request message to the SGSN/MSC 123. SGSN/MSC 123 performs its routine 911 and returns a location report or a verification report 912 to the GMLC 112, which repeats it to the GMLC 102 (step 252, FIG. 12D).

GMLC 102 executes steps 216~218 for verification and then performs a second privacy check 913 on the received location information (steps 219, 220, 221). The location report 914 is then transmitted (step 222) to the requesting GMLC 112, which repeats this location report 915 (steps 242, 222) to the client terminal 111.

Fourth Network Mode

Figure 18:
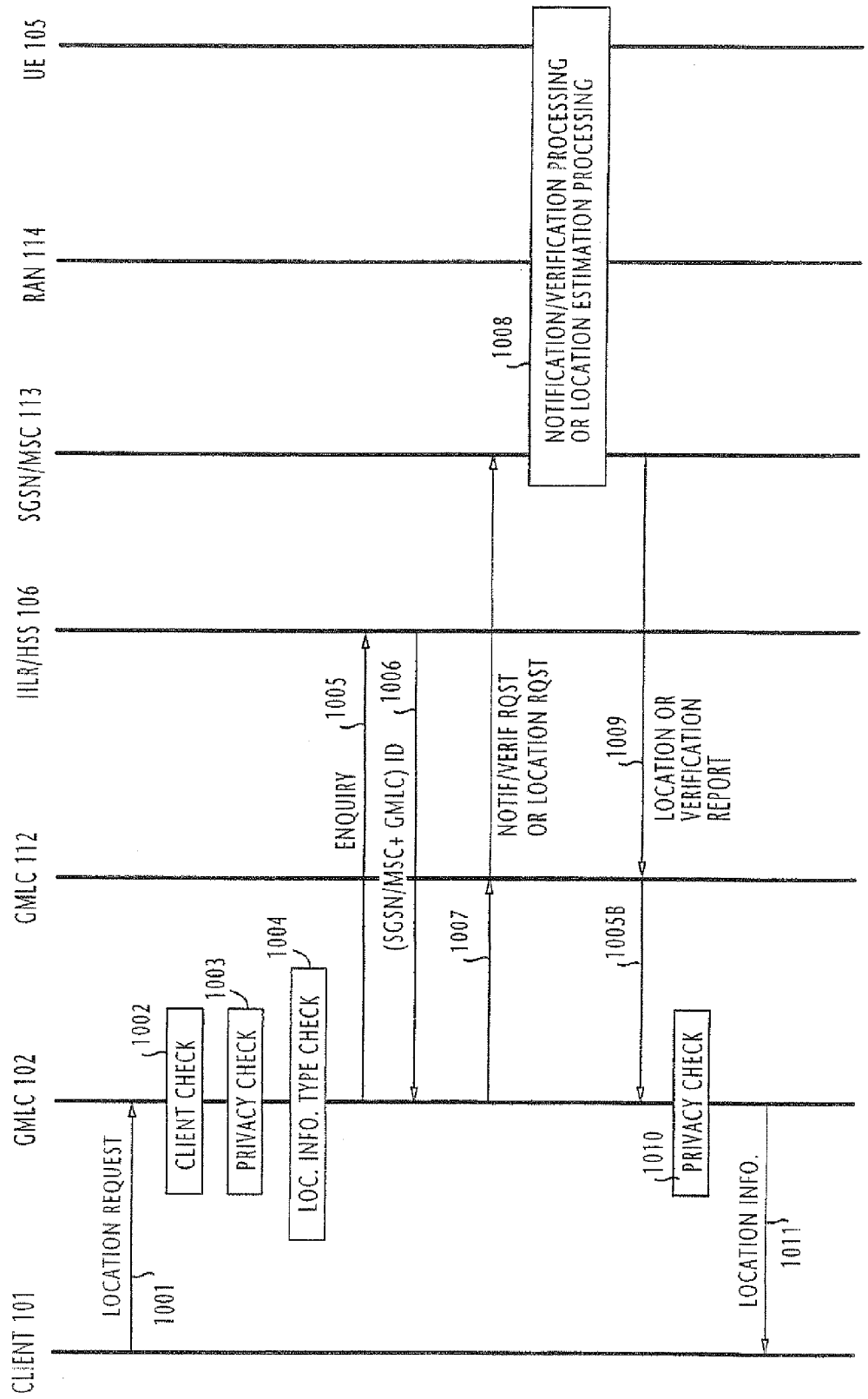
FIG. 18 is a sequence diagram associated with the fourth network mode of operation.

FIG. 18 is a sequence diagram illustrating a location network operating in the MT-LR mode in which the client terminal 101 is the requesting terminal, the mobile terminal 105 is the target UE which is currently visiting the external network B, and the home GMLC 102 of target UE 105 maintains its privacy profile and location report. Client terminal 101 initially transmits a location request 1001 to the home GMLC 102. In response, the GMLC 102 executes steps 200 through 211 (FIG. 12A) to perform a client check (event 1002), a privacy check 1003 and an information type check 1004. Since the target UE is visiting the network of SGSN/MSC 113, the GMLC 102 acquires the identifiers of SGSN/MSC 113 and GMLC 112 (events 1005, 1006) from HLR/HSS 106 when its has executed steps 212 and 213, and sends a notification/verification or location request message (each containing the acquired node identifiers) to the GMLC 112 (event 1007). GMLC 112 executes steps 201, 251 (FIG. 12D) to repeat the received request message to the SGSN/MSC 113.

SGSN/MSC 113 executes steps 300, 320~323 of FIG. 13 in response to the notification/verification message from the GMLC 112 or executes steps 300, 321~332 in response to the location request 1008 from the GMLC 112 and sends a location report or a verification report 1009 to the GMLC 112. GMLC 112 executes step 252 (FIG. 12D) to repeat the received report message to the GMLC 102.

If verification report is received, the GMLC 102 checks to see if the target UE has verified the request (step 217). If the request is verified, the GMLC 102 performs a second privacy check 1010 on the current or last known location information by executing steps 219 to 221 and transmits location information 1011 to the client terminal 101.

Fifth Network Mode

Figure 19:
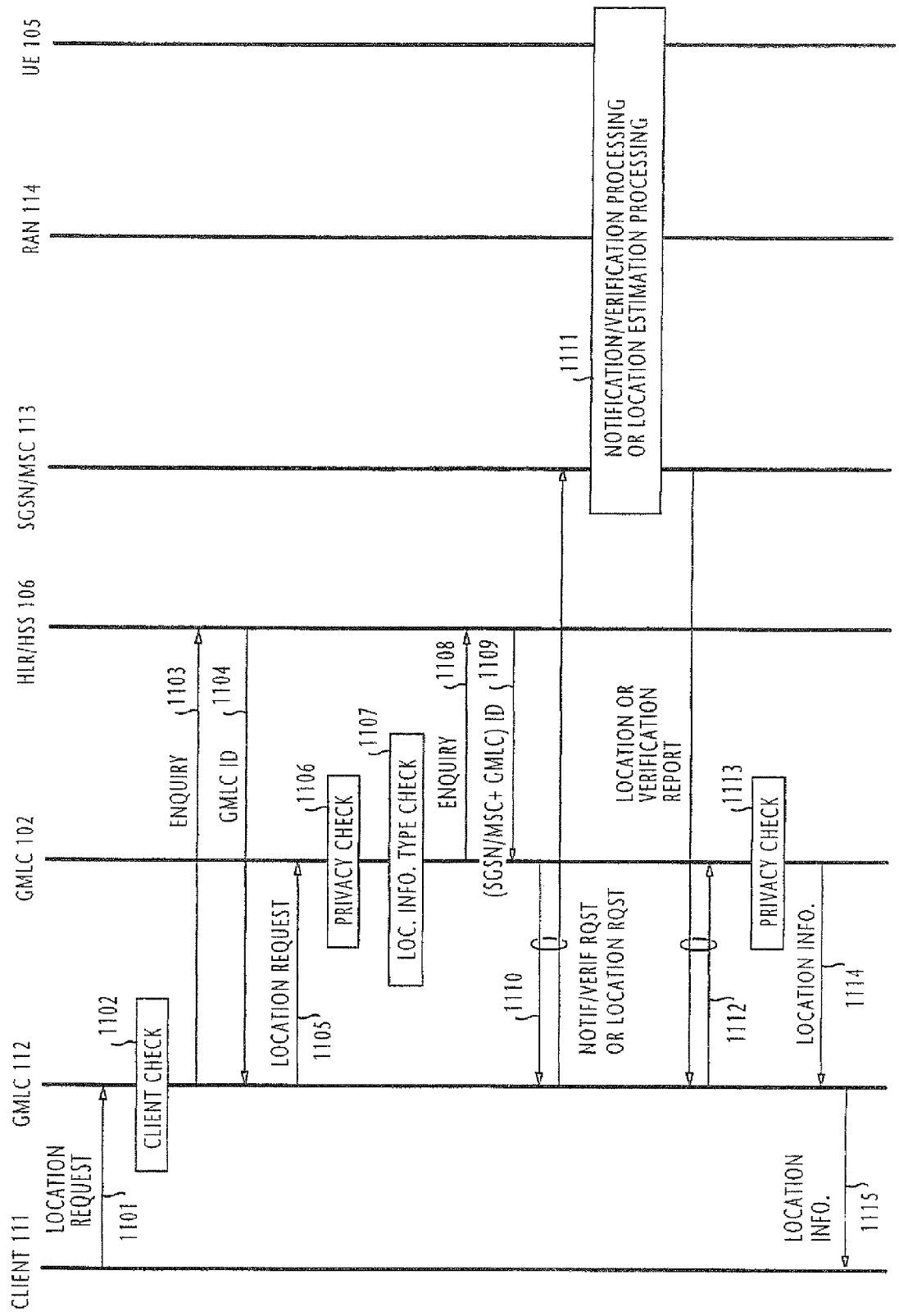
FIG. 19 is a sequence diagram associated with the fifth network mode of the present invention.

FIG. 19 is a sequence diagram illustrating a location network operating in the MT-LR mode in which the client terminal 111 is the requesting terminal, the mobile terminal 105 is the target UE which is currently visiting the external network B, and the home GMLC 102 of target UE 105 maintains its privacy profile and location report. Client terminal 111 initially transmits a location request 1101 to the home GMLC 112. In response, the GMLC 112 executes steps 201~203 (FIG. 12A) to perform a client check 1102. Since the privacy information of the target UE is not available, the GMLC 112 passes through steps 204, 205 and executes steps 241 and 242 (FIG. 12C) to acquire the identifier of GMLC 102 (events 1103, 1104) from the home HLR/HSS 106 of the target UE 105 and sends a location request 1105 to the GMLC 102.

In response to the location request from GMLC 112, the GMLC 102 passes through steps 201, 204 and executes steps 206~211 to perform a first privacy check 1106 and information type check 1107 and executes steps 212·215 to obtain the identifiers of SGSN/MSC 113 and GMLC 112 from HLR/HSS 106 (events 1108, 1109). On receiving these identifiers, the GMLC 102 executes step 215 and transmits a notification/verification request or a location request 1110 to the GMLC 112. Each of these requests contains the identifiers of SGSN/MSC 113 and GMLC 112. In response to the request message from the GMLC 102, the GMLC 112 passes through step 201 to step 251 (FIG. 12D) to repeat the received request message to the SGSN/MSC 113. SGSN/MSC 113 performs notification/verification or location estimation routine 1111 and returns a location report or a verification report 1112 to the GMLC 112, which repeats the report to the GMLC 102 (step 252, FIG. 12D).

GMLC 102 executes steps 216~218 for verification and then performs a second privacy check 1113 on the received location information (steps 219, 220, 221). If the privacy check result is favorable, the location report 1114 is transmitted from the GMLC 102 (step 222) to the requesting GMLC 112, which repeats this location report 1115 to the client terminal 111 (steps 242, 222).

Sixth Network Mode

Figure 20:
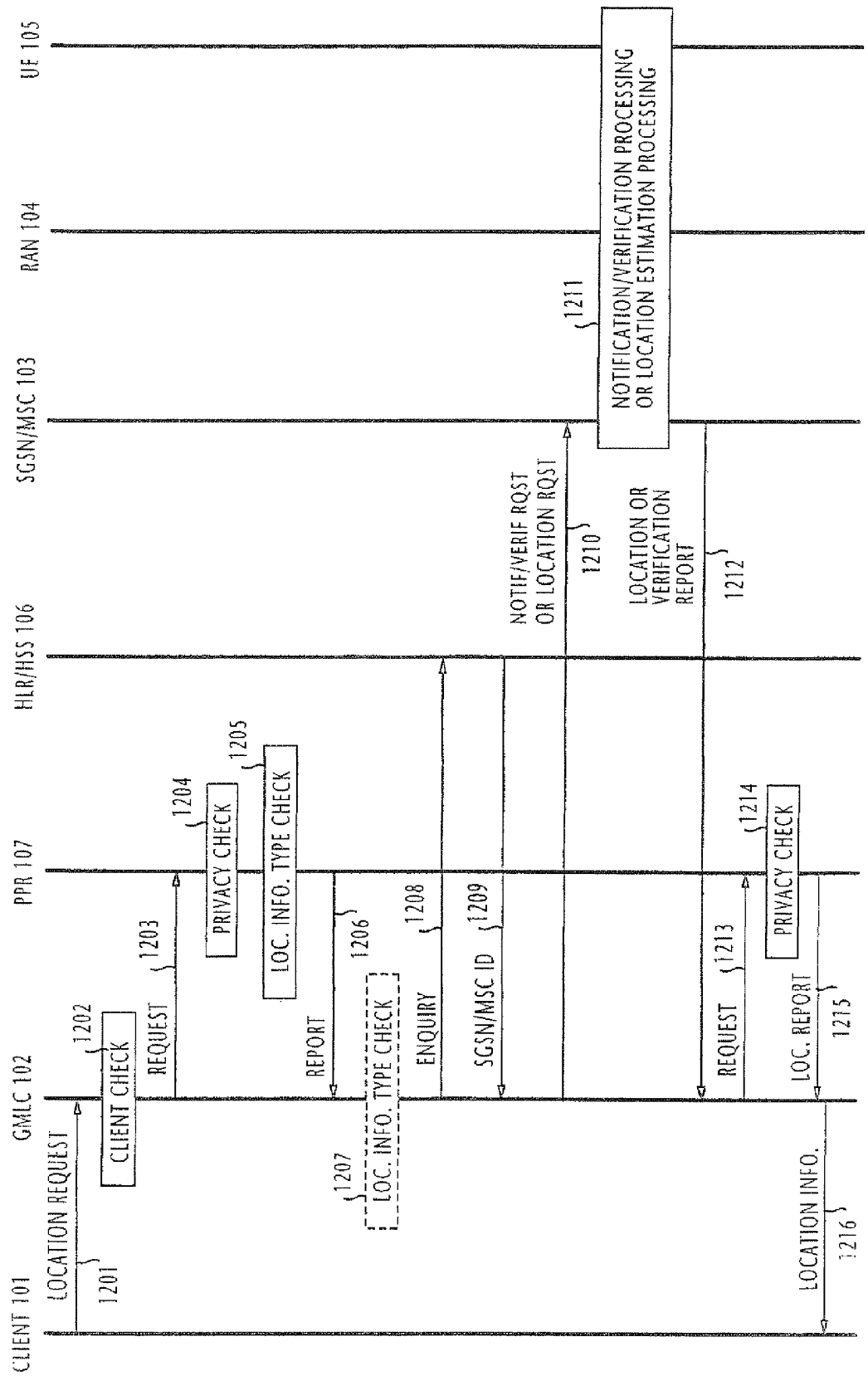
FIG. 20 is a sequence diagram associated with the sixth network mode of the present invention.

FIG. 20 is a sequence diagram illustrating a location network operating in the MT-LR mode in which the client terminal 101 is the requesting terminal and the mobile terminal 105 is the target UE which is staying in the home network A. The PPR 107 is connected to the GMLC 102. The privacy profile and location report of target UE 105 are maintained in the PPR 107. Client terminal 101 initially transmits a location request 1201 to the home GMLC 102. In response, the GMLC 102 performs a client check 1202 (steps 202~203) and sends an authorization request 1203 to the PPR 107 (steps 204, 224). PPR 107 performs a first privacy check 1204 and a location information type check 1205 and returns a report message 1206. Alternatively, information type check 1207 may be provided by the GMLC 102.

GMLC 102 analyzes the received report message 1206 (step 225) and executes steps 212 and 213 to send an enquiry message 1208 to HLR/HSS 106 to acquire the identifier 1209 of SGSN/MSC 103 and transmits a notification/verification message or a location request message 1210 to the SGSN/MSC 103.

SGSN/MSC 103 performs a notification/verification process or location estimation process 1211 and returns a location report or verification report message 1212 to the GMLC 102.

In response to the report message, the GMLC 102 sends an authorization request 1213 to the PPR 107 (steps 216, 217, 218, 261) to authorize it to perform a second privacy check 1214 and then analyzes a privacy check report 1215 from the PPR 107, indicating a result of the second privacy check (step 262). If the result of the privacy check is favorable, the GMLC 102 repeats the location information 1216 received from the SGSN/MSC 103 to the client terminal 101.

Seventh Network Mode

Figure 21:
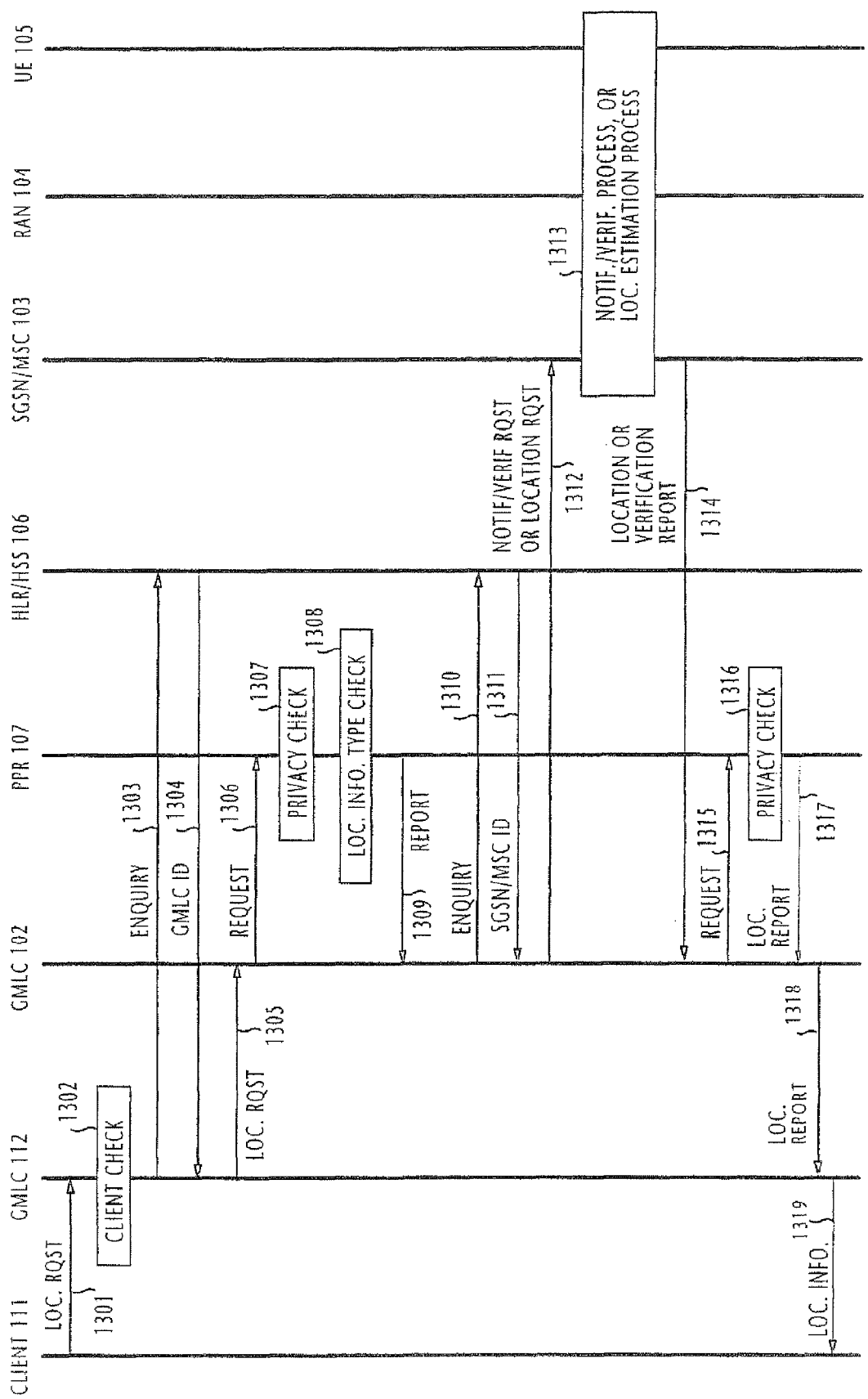
FIG. 21 is a sequence diagram associated with the seventh network mode of the present invention.

FIG. 21 is a sequence diagram illustrating a location network operating in MT-LR mode in which the client terminal 111 is the requesting terminal and the mobile terminal 105 is the target UE which is located in the home network A. The privacy profile and location report of target UE 105 are maintained in the PPR 107 connected to the GMLC 102. Client terminal 111 initially transmits a location request 1301 to the home GMLC 112. In response, the GMLC 112 performs a client check 1302 (steps 202~203) and transmits an enquiry message 1303 to the HLR/HSS 106 to acquire the identifier 1304 of the home GMLC 102 of the target UE. Using the acquired identifier, the GMLC 112 sends a location request 1305 to the GMLC 102. GMLC 102 responds to the location request by transmitting an authorization request 1306 to the PPR 107. PPR 107 performs a first privacy check 1307 and an information type check 1308 and returns a report message 1309 to the GMLC 102.

GMLC 102 analyzes the received report (step 225) and executes steps 212 and 213 to acquire the identifier of SGSN/MSC 103 from HLR/HSS 106 (events 1310, 1311) and transmits a notification/verification message or a location request message 1312 to the SGSN/MSC 103.

SGSN/MSC 103 performs a notification/verification process or location estimation process 1313 and returns a location report or verification report message 1314 to the GMLC 102.

In response to the report message 1314, the GMLC 102 sends an authorization request 1315 to the PPR 107 (steps 216, 217, 218, 261) to authorize it to perform a second privacy check 1316 and analyzes a privacy check report 1317 from the PPR 107 (step 262). If the result of the privacy check is favorable, the GMLC 102 sends the location information 1319 received from the SGSN/MSC 103 to the client terminal 101.

Eighth Network Mode

Figure 22:
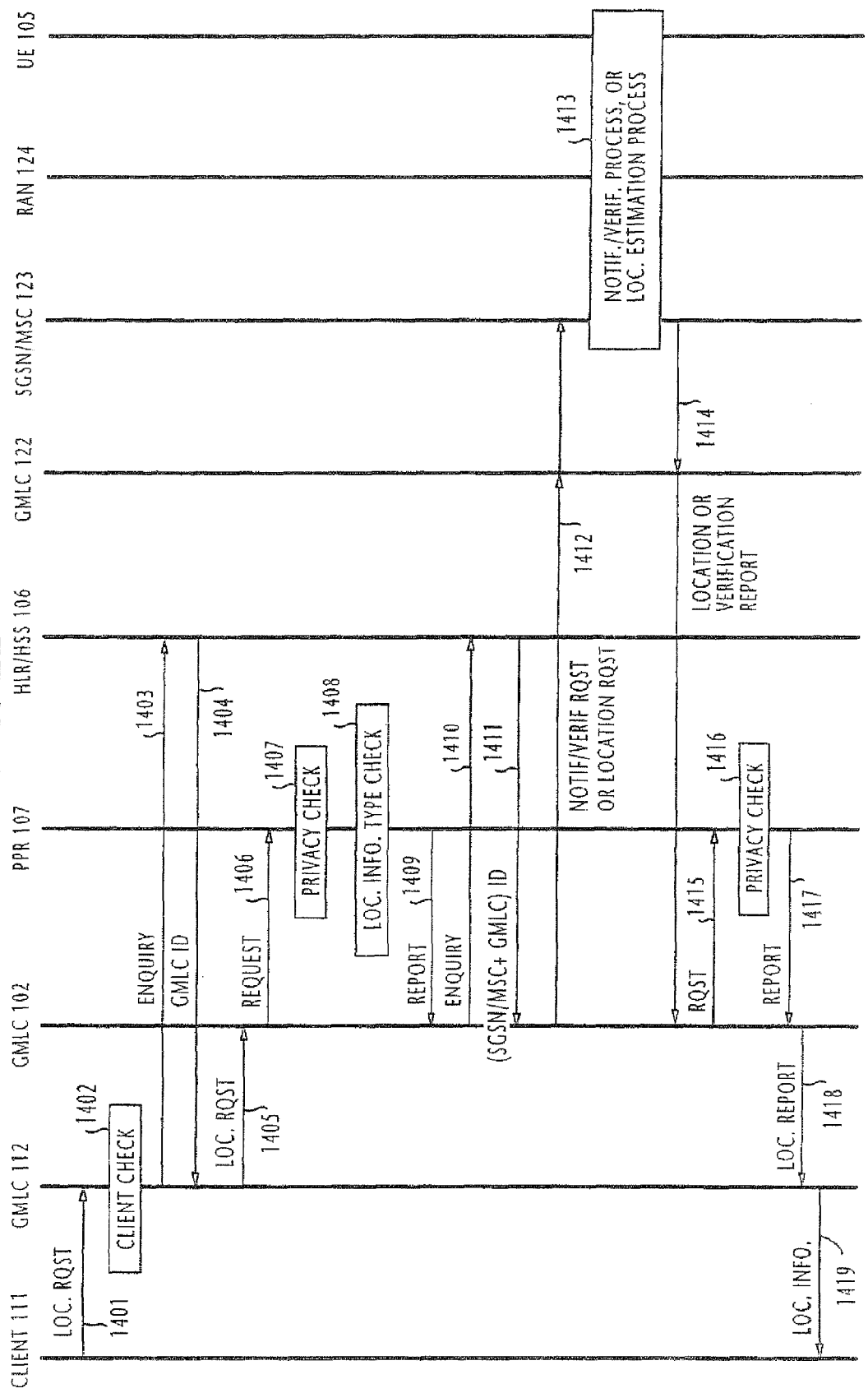
FIG. 22 is a sequence diagram associated with the eighth network mode of the present invention.

FIG. 22 is a sequence diagram illustrating a location network operating in the MT-LR mode in which the client terminal 111 is the requesting terminal and the mobile terminal 105 is the target UE which is visiting the external network C. The privacy profile and location report of target UE 105 are maintained in the PPR 107 connected to the GMLC 102. Client terminal 111 transmits a location request 1401 to the home GMLC 112. In response, the GMLC 112 performs a client check 1402 and transmits an enquiry message 1403 to the HLR/HSS 106 to acquire the identifier 1404 of the home GMLC 102 of the target UE. Using the acquired identifier, the GMLC 112 sends a location request 1405 to the GMLC 102. GMLC 102 responds to the location request by transmitting an authorization request 1406 to the PPR 107. PPR 107 performs a first privacy check 1407 and an information type check 1408 and returns a report message 1409 to the GMLC 102.

GMLC 102 acquires the identifiers of SGSN/MSC 123 and GMLC 122 from HLR/HSS 106 (events 1410, 1411) and transmits a notification/verification message or a location request message 1412 to the SGSN/MSC 123 via the GMLC 122.

SGSN/MSC 123 performs a notification/verification process or location estimation process 1413 and returns a location report or verification report message 1414 to the GMLC 102 via the GMLC 122. In response to the report message 1414, the GMLC 102 sends an authorization request 1415 to the PPR 107 to authorize it to perform a second privacy check 1416 and analyzes a privacy check report 1417 from the PPR 107. If the result of the privacy check is favorable, the GMLC 102 sends the location information 1418 received from the SGSN/MSC 123 to the GMLC 112, which sends location information 1419 to the client terminal 111.

Ninth Network Mode

Figure 23:
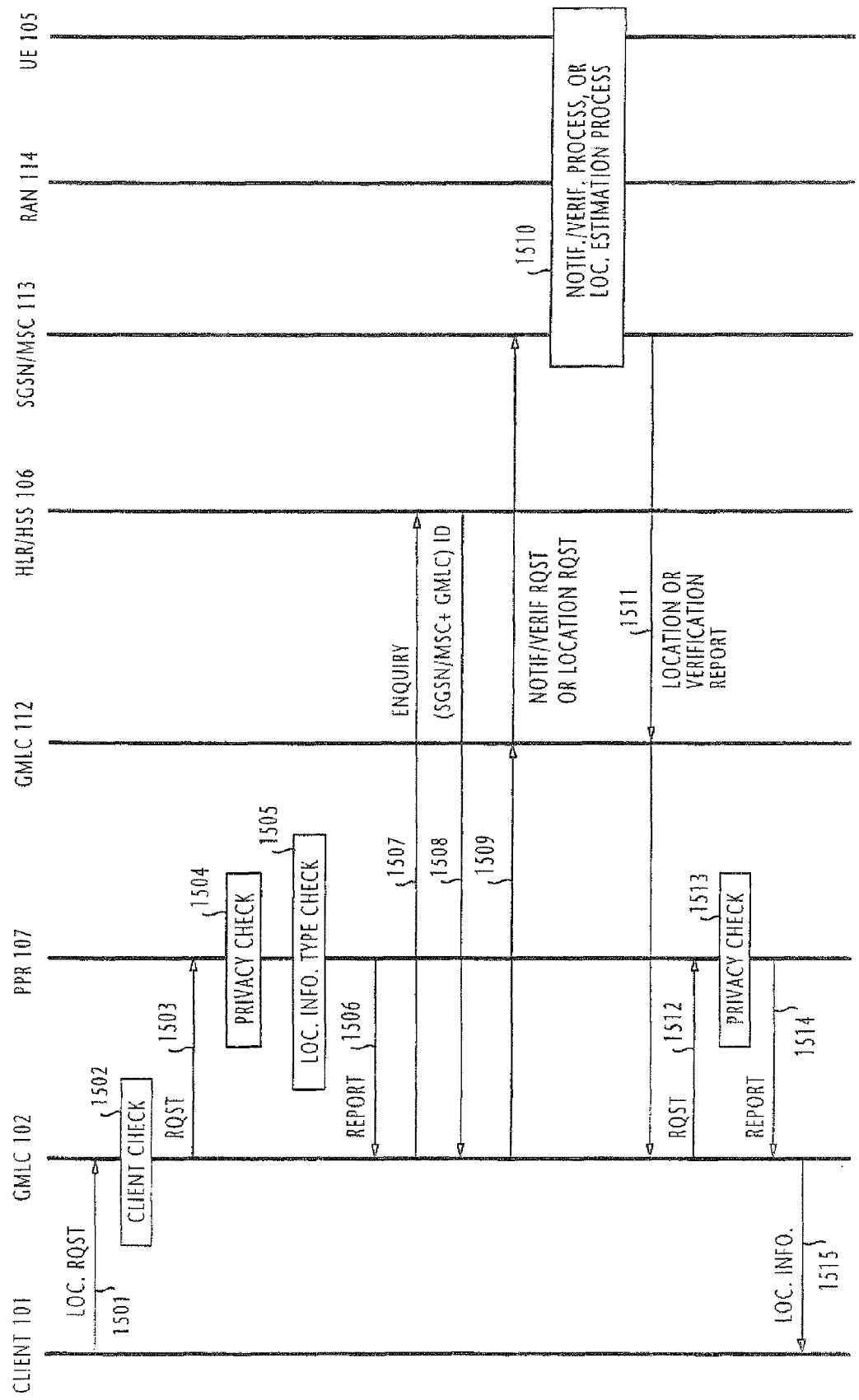
FIG. 23 is a sequence diagram associated with the ninth network mode of the present invention.

FIG. 23 is a sequence diagram illustrating a location network operating in the MT-LR mode in which the client terminal 101 is the requesting terminal and the target UE 105 is visiting the external network B. The privacy profile and location report of the target UE are maintained in the PPR 107 connected to the GMLC 102. Client terminal 101 transmits a location request 1501 to the home GMLC 102. In response, the GMLC 102 performs a client check 1502 and transmits an authorization request 1503 to the PPR 107. PPR 107 performs a first privacy check 1504 and an information type check 1505 and returns a report message 1506 to the GMLC 102.

GMLC 102 acquires the identifiers of SGSN/MSC 113 and GMLC 112 from HLR/HSS 106 (events 1507, 1508) and transmits a notification/verification message or a location request message 1509 to the SGSN/MSC 113 via the GMLC 112.

SGSN/MSC 113 performs a notification/verification process or location estimation process 1510 and returns a location report or verification report message 1511 to the GMLC 102 via the GMLC 112. In response to the report message 1511, the GMLC 102 sends an authorization request 1512 to the PPR 107 to authorize it to perform a second privacy check 1513 and analyzes a privacy check report 1514 from the PPR 107. If the result of the privacy check is favorable, the GMLC 102 sends location information 1515 received from the SGSN/MSC 113 to the client terminal 101.

Tenth Network Mode

Figure 24:
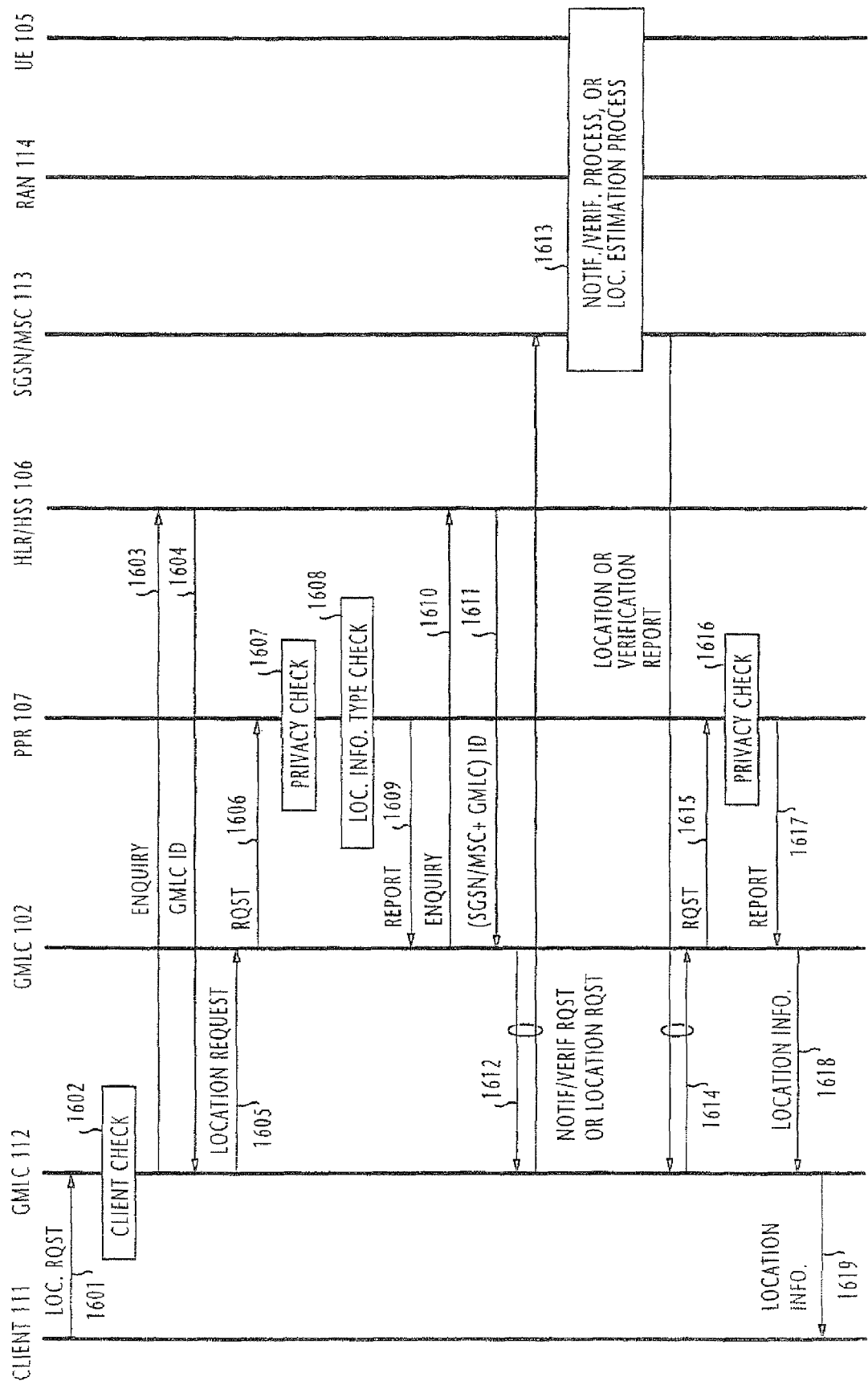
FIG. 24 is a sequence diagram associated with the tenth network mode of the present invention.

FIG. 24 is a sequence diagram illustrating a location network operating in MT-LR mode in which the client terminal 111 is the requesting terminal and the target UE 105 is visiting the external network B. The privacy profile and location report of target UE 105 are maintained in the PPR 107 connected to the GMLC 102. Client terminal 111 transmits a location request 1601 to the home GMLC 112. In response, the GMLC 112 performs a client check 1602 and transmits an enquiry message 1603 to the HLR/HSS 106 to acquire the identifier 1604 of the home GMLC 102 of the target UE. Using the acquired identifier, the GMLC 112 sends a location request 1605 to the GMLC 102. GMLC 102 responds to the location request by transmitting an authorization request 1606 to the PPR 107. PPR 107 performs a first privacy check 1607 and an information type check 1608 and returns a report message 1609 to the GMLC 102.

GMLC 102 acquires the identifiers of SGSN/MSC 113 and GMLC 112 from HLR/HSS 106 (events 1610, 1611) and transmits a notification/verification message or a location request message 1612 to the SGSN/MSC 113 via the GMLC 112.

SGSN/MSC 113 performs a notification/verification process or location estimation process 1613 and returns a location report or verification report message 1614 to the GMLC 102 via the GMLC 112.

In response to the report message 1614, the GMLC 102 sends an authorization request 1615 to the PPR 107 to authorize it to perform a second privacy check 1616 and analyzes a privacy check report 1617 from the PPR 107. If the result of the privacy check is favorable, the GMLC 102 sends the location report 1618 received from the SGSN/MSC 113 to the GMLC 112 which transmits the location information 1619 to the client terminal 111.

What is claimed is:

1. A location service system for locating a target mobile terminal, comprising:
   a client terminal which transmits a location request of the target mobile terminal, and requested accuracy and requested allowable age;
   a positioning system which produces location information of the target mobile terminal; and
   a gateway which transmits the location request to said positioning system and stores previously obtained location information of the target mobile terminal and a privacy profile of the target mobile terminal,
   wherein the gateway performs a first privacy check for verifying the location request by referring to the privacy profile of the target mobile terminal, performs a reusability check to determine if the stored, previously obtained, location information satisfies the requested accuracy and the requested allowable age, and if the reusability check is affirmative, then performs a second privacy check on the stored, previously obtained, location information by referring to information specified in the location request based on the privacy profile of the target mobile terminal, without transmitting the verified location request to the positioning system, in order to decide whether said gateway can transmit the stored, previously obtained, location information to the client terminal.

2. The location service system of claim 1, wherein said gateway transmits a notification message to said target mobile terminal if the privacy profile of the target mobile terminal indicates that the notification message is to be sent to said target mobile terminal in the first privacy check.

3. The location service system of claim 2, wherein said notification message includes a verification request and said gateway receives a verification report from the target mobile terminal to determine if the verification report allows said stored, previously obtained, location information to be forwarded to said client terminal.

4. A location method of a location service system for locating a target mobile terminal, wherein a positioning system for producing location information of the target mobile terminal in response to a request from a gateway is provided, the method comprising:
   transmitting, at a client terminal, a location request of the target mobile terminal, requested accuracy and requested allowable age;
   performing, at the gateway which stores previously obtained location information of the target mobile terminal and a privacy profile of the target mobile terminal, a first privacy check for verifying the location request from the client terminal by referring to the privacy profile of the target mobile terminal;
   performing, at the gateway, a reusability check to determine if the stored, previously obtained, location information satisfies the requested accuracy and the requested allowable age; and
   performing, at the gateway, a second privacy check on said stored, previously obtained, location information by referring to information specified in the verified location request in order to decide whether the gateway can transmit the stored, previously obtained, location information to the client terminal without transmitting the verified location request to the positioning system if said reusability check is affirmative.

5. The method of claim 4, wherein the performing of the second privacy check comprises the step of transmitting a notification message to said target mobile terminal if the privacy profile of the target mobile terminal indicates that the notification message is to be sent to the target mobile terminal in the first privacy check.

6. The method of claim 5, wherein the step of transmitting the notification message to said target mobile terminal includes:

transmitting a verification message to said target mobile terminal;

receiving a verification report from the target mobile terminal; and determining if the verification report allows said stored, previously obtained, location information to be forwarded to said client terminal.

7. A gateway of a location service system, wherein a positioning system for producing location information of a target mobile terminal is provided for locating the target mobile terminal, the gateway comprising:

storage means for storing previously obtained location information of the target mobile terminal from the positioning system and a privacy profile of the target mobile terminal;

first privacy check means for verifying a location request of the target mobile terminal, requested accuracy, and requested allowable age from a client terminal by referring to the privacy profile of the target mobile terminal stored in the storage means;

reusability check means for determining if the stored, previously obtained, location information stored in the storage means satisfies the requested accuracy and the requested allowable age; and second privacy check means for performing a second privacy check, if the reusability check is affirmative, on said stored, previously obtained, location information stored in the storage means, without transmitting the verified location request to the positioning system, in order to decide whether the stored, previously obtained, location information stored in the storage means can be transmitted to the client terminal.

8. The gateway of claim 7, wherein said gateway further comprises notification means for transmitting a notification message to said target mobile terminal if the first privacy check means has detected, in the privacy profile of the target mobile terminal, that the notification message is to be transmitted to the target mobile terminal.

9. The gateway of claim 8, wherein said notification message includes a verification request, and said notification means receives a verification report from the target mobile terminal and determines if the verification report allows the stored, previously obtained, location information to be forwarded to the client terminal.

10. A gateway of a location service system, wherein a positioning system for producing location information of a target mobile terminal is provided for locating the target mobile terminal, the gateway comprising:

a storage unit that stores previously obtained location information of the target mobile terminal from the positioning system and a privacy profile of the target mobile terminal;

a first privacy check unit that verifies a location request of the target mobile terminal, requested accuracy, and requested allowable age from a client terminal by referring to the privacy profile of the target mobile terminal stored in the storage unit;

a reusability check unit that determines if the stored, previously obtained, location information stored in the storage means satisfies the requested accuracy and the requested allowable age; and a second privacy check unit that performs a second privacy check, if the reusability check is affirmative, on said stored, previously obtained, location information stored in the storage unit, without transmitting the verified location request to the positioning system, in order to decide whether the stored, previously obtained, location information stored in the storage unit can be transmitted to the client terminal.

* * * * *